US012692845B2

(12) United States Patent
Jensen et al.

(10) Patent No.: US 12,692,845 B2
(45) Date of Patent: Jul. 28, 2026

(54) COATING APPLICATOR TOOL HEAD USED WITH AUTOMATED DEVICE FOR REPAIRING LEADING EDGE DAMAGE ON WIND TURBINE BLADE

(71) Applicant: Vestas Wind Systems A/S, Aarhus (DK)

(72) Inventors: Ivar J.B.K. Jensen, Hornslet (DK); Aksel Petersen, Rinkøbing (DK); Asger Bioksma Krogstrup, Nibe (DK); André Alexander Westergaard, Ryomgård (DK); Claus Engholm Nielsen, Ringkøbing (DK); Lean Frandsen, Holstebro (DK); Anders Tuxen, Risskov (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/966,847

(22) Filed: Dec. 3, 2024

(65) Prior Publication Data

US 2025/0092859 A1     Mar. 20, 2025

Related U.S. Application Data

(63) Continuation of application No. 17/783,849, filed as application No. PCT/DK2020/050391 on Dec. 18, 2020, now abandoned.

(30) Foreign Application Priority Data

Dec. 18, 2019   (DK) ........................... PA 2019 70789
Jan. 27, 2020   (DK) ........................... PA 2020 70050

(51) Int. Cl.
*F03D 80/50*        (2016.01)
*B05C 1/08*         (2006.01)
        (Continued)

(52) U.S. Cl.
CPC ............ *F03D 80/50* (2016.05); *B05C 1/0813* (2013.01); *B05C 1/0873* (2013.01); *B05C 9/14* (2013.01);
        (Continued)

(58) Field of Classification Search
CPC ...... F03D 80/00; F03D 80/50; F05B 2230/80; F05B 2230/90; F05B 2230/608;
        (Continued)

(56) References Cited

U.S. PATENT DOCUMENTS 2,804,767 A      9/1957   Schoen
6,217,944 B1 *   4/2001   Yoshida ................ B05B 15/555
                                                    427/427.2

(Continued)

FOREIGN PATENT DOCUMENTS

DE        3526257 A1    1/1987
EP        3211216 A1    8/2017
        (Continued)

OTHER PUBLICATIONS

Lee, ?Kwang, "Painting Drone and Painting system using it," KR 20190118229 Korean Patent Office, Oct. 18, 2019 (Year: 2019).*

(Continued)

*Primary Examiner* — Nathaniel E Wiehe
*Assistant Examiner* — Joshua R Beebe
(74) *Attorney, Agent, or Firm* — Wood Herron & Evans LLP

(57)           ABSTRACT
A coating applicator tool head configured for use with a robotic maintenance device includes a tool head body with a frame, a supply container, a drive for actuating delivery of flow of coating from the supply container, a feed tube, a nozzle receiving flow from the feed tube, and a spreading tool such as a roller brush or a spatula receiving flow from the nozzle. The coating applicator tool head is moved by an (Continued)

articulated arm of the maintenance device over surface of a wind turbine blade containing damage such that the roller brush or spatula can apply layers of the coating to cover and fill in the damage. The nozzle directly supplies coating continuously onto the roller brush or the spatula, and the drive can be configured to independently adjust supply of two or more different components in the supply container that may be mixed to form the coating.

25 Claims, 22 Drawing Sheets

(51) Int. Cl.
| | |
|---|---|
| *B05C 9/14* | (2006.01) |
| *B05C 11/04* | (2006.01) |
| *B05C 11/10* | (2006.01) |
| *B05D 1/28* | (2006.01) |

(52) U.S. Cl.
CPC .......... *B05C 11/04* (2013.01); *B05C 11/1036* (2013.01); *B05D 1/28* (2013.01); *F05B 2230/90* (2013.01)

(58) Field of Classification Search
CPC .. B23P 6/007; B23P 6/002; B23P 6/00; B05C 11/04; B05C 11/1036; B05C 9/14; B05C 1/0813; B05C 1/0873; B05D 1/28
See application file for complete search history.

(56) References Cited

U.S. PATENT DOCUMENTS

| | | | | |
|---|---|---|---|---|
| 2004/0186201 | A1* | 9/2004 | Stoffer | C09C 1/56 |
| | | | | 524/495 |
| 2011/0081499 | A1* | 4/2011 | Parks | B05B 7/2405 |
| | | | | 427/428.01 |
| 2014/0061240 | A1* | 3/2014 | Gabrielson | B05C 5/0225 |
| | | | | 222/145.5 |
| 2015/0148949 | A1* | 5/2015 | Chin | B25J 13/006 |
| | | | | 700/245 |
| 2017/0113799 | A1 | 4/2017 | Kovac et al. | |
| 2017/0274409 | A1* | 9/2017 | Kordy | B05C 11/04 |
| 2019/0093373 | A1 | 3/2019 | Telleria et al. | |
| 2019/0338759 | A1 | 11/2019 | Badger et al. | |
| 2020/0171552 | A1* | 6/2020 | Hamamura | B25J 11/0065 |
| 2020/0318619 | A1* | 10/2020 | Laurberg | B25J 19/00 |

FOREIGN PATENT DOCUMENTS

| | | |
|---|---|---|
| KR | 20190118229 A | 10/2019 |
| WO | 2008157013 A1 | 12/2008 |
| WO | 2018155704 A1 | 8/2018 |
| WO | 2019068299 A1 | 4/2019 |
| WO | 2019068300 A1 | 4/2019 |
| WO | 2019155234 A1 | 8/2019 |

OTHER PUBLICATIONS

Gerhard, Voswinckel, "Apparatus for applying a defined amount of product to a roller casing" Machine Translation, DE 3526257 A1 Jan. 1, 1987 (Year: 1987).*

China National Intellectual Property Administration, office action issued in corresponding CN Application No. 202080096199.6, dated Feb. 22, 2025 (with translation).

Danish Patent and Trademark Office, Search and Examination Report in PA 2020 70050, Aug. 21, 2020.

Danish Patent and Trademark Office, Search and Examination Report in PA 2019 70789, Jun. 15, 2020.

European Patent Office, International Search Report and Written Opinion in PCT Application No. PCT/ DK2020/050391, Apr. 1, 2021.

Lyngby, Rasmus A. et al., "General rights Copyright and moral rights for Autonomous surface inspection of wind turbin blades for quality assurance in production creative commons CC-BY-NC license https Automonous surface inspection of wind turbine blades for quality assurance in product", Proceedsing of 9th European Workshop on Structural Health Monitoring Citation Proceedings of 9th European Workshop on Structural Health Monitoring, Jul. 1 Jan. 2018 (Jan. 1, 2018), pp. 1-13, XP005788687, Retrieved from the Internet: URL:htps://orbit.dtu.dk/.

Siemensgamesa, "How a small robot innovates rotor blade inspection", Dec. 12, 2018 (Dec. 12, 2018), p. 1, XP054981584, Retrieved from the Internet: URL:https://www.youtube.com/watch?v= JQ414q3gPyk [retrieved on Mar. 23, 2021].

European Patent Office, Extended European Search Report issued in corresponding EP Application No. 23155257.1. dated Apr. 19, 2023.

China National Intellectual Property Administration, Decision of Rejection issued in corresponding CN Application No. 2020800961996 dated Dec. 18, 2025.

European Patent Office, Search Report and Examination, Application No. 20 830 064.0, Issued May 12, 2026.

* cited by examiner

COATING APPLICATOR TOOL HEAD USED WITH AUTOMATED DEVICE FOR REPAIRING LEADING EDGE DAMAGE ON WIND TURBINE BLADE

CROSS REFERENCE TO RELATED APPLICATION

This application is a continuation of U.S. patent application Ser. No. 17/783,849, filed Jun. 9, 2022 (pending), which is a U.S. National Phase Application of International Application No. PCT/DK2020/050391, filed Dec. 18, 2020 (expired), which claimed the benefit of Danish Application Serial Nos. PA 202070050, filed Jan. 27, 2020 (expired), and PA 201970789, filed Dec. 18, 2019 (expired), the disclosures of which are incorporated by reference herein in their entirety.

TECHNICAL FIELD

This application relates generally to wind turbines, and more particularly, relates to an automated robotic device and method for repairing damage along the leading edge of a wind turbine blade without necessitating removal of the blade from the tower of the wind turbine or manual repairs by rope access technicians.

BACKGROUND

Wind turbines are used to produce electrical energy using a renewable resource and without combusting a fossil fuel. Generally, a wind turbine converts kinetic energy from the wind into electrical power. A conventional wind turbine installation includes a foundation, a tower supported by the foundation, and an energy generating unit positioned atop of the tower. The energy generating unit typically includes one or more nacelles to house several mechanical and electrical components, such as a generator, gearbox, and main bearing, and the wind turbine also includes a rotor operatively coupled to the components in the nacelle through a main shaft extending from the nacelle. Single rotor wind turbines and multi-rotor wind turbines (which may have multiple nacelles) are known, but for the sake of efficiency, the following description refers primarily to single rotor designs. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with many wind turbine installations being located both on land and offshore.

As noted above, blades interact with the wind to generate mechanical rotation of the rotor, which can then be converted into electrical energy. A wind turbine blade is a complex structure that must be constructed to withstand long-term service in an abusive environment, while also maximizing lift and minimizing drag forces. The blades move at varying speeds through the ambient environment surrounding the wind turbine, but often this movement is at high speed. Consequently, the blades will typically experience erosion and damage over time in operation as a result of friction from the air as well as potential impacts from particulate matter, debris, or other items in the air, especially along the leading edge facing the direction of movement through the wind. The erosion or damage along the leading edge of the blade adversely affects the aerodynamic qualities of the blade over time, resulting in lower power production for given incoming wind speeds. Such erosion and damage on the blades can be corrected by routine maintenance and repair procedures.

The blades are typically formed from a shell of layered fiber composite, aluminum, or similar material with an outer skin defined by a series of layers of coatings (polymeric elastomers, paint, etc.) surrounding and covering an outer surface of the shell. The shell encloses internal components of the blade and isolates them from the environment, including shear webs and spar caps, for example. The outer skin may be defined by several different layers of material, including at least an outermost topcoat, a second layer underneath the outermost topcoat, and a third layer underneath the second layer. Other layers are typically present underneath the third layer as well, including base materials typically made from fibre composites and the like. The topcoat, second layer, and third layer may be formed from different colors of material so as to more easily reveal how deep an erosion or damaged portion goes into the outer skin of the blade. Damage to the blade outer skin can be categorized into several different levels of severity based on which layer the damage extends to, e.g., an erosion to the third layer would be a "category 2" level of severity, which would be higher than a cut to the second layer, which would be a "category 1" level of severity. For low levels of damage or erosion, such damage can be repaired by depositing a coating onto the area to fill in the damage and restore the blade to the original condition along the leading edge thereof.

These types of repairs of the wind turbine blades have typically been conducted in three manners conventionally. First, the blade can be disassembled from the remainder of the wind turbine and lowered to the ground for the repair to be completed. Such a repair process is time-consuming and costly as a result of needing to disassemble, move, and reassemble the blade relative to the top of the tower. Second, a human operator with rope access can rappel along the wind turbine blade while still attached to the rotor hub to evaluate and make repairs as needed to the blade. Once again, such a repair process is time-consuming and costly because of the need for experienced rope access technicians and the time needed to effect the repairs manually. Third, a repair action can be taken by an operator on a platform hoisted into position adjacent the blade on the wind turbine, either extending from the nacelle or hub of the wind turbine or extending from a cherry picker or boom-style lift. In all conventional methods, the wind turbine must be stopped and locked for the time period of repair, and as such, significant power production losses are experienced by wind turbine operators for these necessary maintenance and repair actions. This may lead some operators to delay or procrastinate in making such repairs, which can lead to more significant structural damage and even longer delays when more thorough repairs are necessary at the wind turbine blade.

In recent years, a desire has emerged to allow for some automated maintenance of wind turbine blades, to thereby improve the speed and/or precision of such a process. However, such automated maintenance devices are not always designed for reliable use on a wind turbine blade still connected to the rotor and hub of a wind turbine, and such systems are very slow in operation. As a result, the conventional automated options have not been adopted as manual repair by rope access technicians continues to be quicker and more efficient in many circumstances. Further improvements for automated maintenance and repair systems are desired.

Accordingly, wind turbine manufacturers and operators continue to seek improved options for conducting automated maintenance and repair on the wind turbine blades of modern wind turbine designs.

SUMMARY

To these and other ends, embodiments of the invention are directed to a coating applicator tool head configured to be used with a robotic maintenance device for repairing damage around a leading edge of a wind turbine blade. The tool head includes a tool head body, a feed tube, a roller brush, and a nozzle. The tool head body has a frame and an interface element configured to mechanically and electrically couple with a corresponding interface provided on an articulated arm of the robotic maintenance device. The feed tube is configured to receive a flow of a coating from a supply container, delivering this flow of the coating to the nozzle, which is located adjacent the roller brush. The nozzle spreads the flow of the coating along a width of the roller brush and then applies the coating directly onto the roller brush. The roller brush is configured to be rolled along surfaces of the wind turbine blade, thereby transferring the coating by the roller brush onto the surfaces of the wind turbine blade to apply layers of coating to cover and repair the damage on the wind turbine blade. The direct application of the coating onto the roller brush by the nozzle assures thorough and even coverage as the roller brush is moved over the surface of the blade, thereby improving the repair.

In one embodiment, the nozzle includes a nozzle body, an inlet, and an outlet. The nozzle body extends transversely along the width of the roller brush between opposing ends supported by the frame of the tool head body. The inlet is located centrally between the opposing ends of the nozzle body, and the outlet is defined by an elongate slot cut into the nozzle body to extend between the opposing ends and face towards the roller brush, the elongate slot configured to dispense the coating along the width of the roller brush. In such embodiments, the nozzle body is also formed from an at least partially flexible material such that pressure in the flow of the coating from the inlet expands the elongate slot at a central portion as compared to portions proximate the opposing ends. This causes a higher dispense flow rate of coating onto a center of the roller brush than at the opposite ends thereof.

In another embodiment, the coating applicator tool head includes a supply container, which may be supported on the tool head body. The supply container defines a storage volume for holding a coating to be applied to the wind turbine blade. The coating applicator tool head also includes a drive that is operably engaged with the supply container and may be actuated to deliver a flow of the coating from the supply container to the feed tube, which is connected to the supply container.

In another embodiment, the supply container defines at least two chambers configured to retain different components that can be mixed together to form the coating. The drive includes independent actuators associated with each of the at least two chambers. The tool head then also includes a mixing element connected to the supply container and the feed tube, the mixing element configured to receive the different components from the at least two chambers and mix them into the coating. In such embodiments, the tool head can also include a control system operatively connected to the drive. The control system operates the independent actuators at independently adjustable speeds to supply each of the different components at a mix ratio adapted to produce the coating when mixed at the mixing element. To this end, the control system varies speed of the independent actuators to vary a flow rate of coating being dispensed at the nozzle onto the roller brush. The flow rate is adjusted in accordance with a movement speed of the roller brush so as to continuously apply the coating onto the roller brush during operation of the tool head.

In a further embodiment, the independent actuators of the drive are defined by pistons each configured to move relative to one of the chambers to force flow of an associated component out of the chamber and into the mixing element. The drive thus includes independently actuated motors engaged with each of the pistons. The mixing element of these and other embodiments is defined by a static mixer that mixes the different components as the different components flow through an elongate length of the static mixer.

In another embodiment, the coating applicator tool head also includes a drain container connected to the mixing element and a valve operatively connected to the mixing element, the drain container, and the feed tube. The valve controls flow of the coating exiting the mixing element to be delivered into either the drain container or the feed tube. For example, the valve initially directs the coating to flow into the drain container until a mixing rate of the different components has reached a desired threshold, and then the valve directs the coating to flow into the feed tube for delivery to the nozzle and to the roller brush.

In yet another embodiment, the roller brush is mounted on the frame at opposing ends in such a manner to enable free rotation of the roller brush relative to the frame. Rotation of the roller brush is then actuated by movement of the tool head by the articulated arm back and forth along the surfaces of the wind turbine blade. The tool head in some embodiments further includes a curing means mounted on the frame at a position spaced away from the roller brush. The curing means is configured to apply heat energy and/or light towards the coating after application on the surfaces of the wind turbine blade to help cure and solidify a repaired area covered by the coating. For example, the curing means may be a heater configured to generate and radiate infrared heat energy or a light source configured to use ultraviolet light to cure the coating. The IR heat energy or UV light helps cure and solidify the repaired area covered by the coating. It will be understood that the various features described in these embodiments of the coating applicator tool head may be combined in any combination and sub-combination to achieve the desired technical advantages and effects described herein.

Further embodiments of the coating applicator tool head may be defined as follows. In one such embodiment, the coating applicator includes a tool head body, a spreading tool, a supply container, a drive, a mixing element, and a control system. The tool head body includes a frame and an interface element configured to mechanically and electrically couple with a corresponding interface provided on an articulated arm of the maintenance device. The spreading tool is mounted on the frame and is configured to be moved along surfaces of the wind turbine blade to spread a coating on the blade. The supply container defines at least two chambers configured to retain different components that can be mixed together to form a coating to be dispensed on the spreading tool for application to the blade. The drive operatively engages with the supply container such that actuations of the drive cause delivery of a flow of the coating from the supply container. The drive includes independent actuators associated with each of the at least two chambers. The mixing element is connected to the supply container and is configured to receive the different components from the chambers and mix them into the coating. The control system operates the independent actuators of the drive at independently adjustable speeds to supply each of the different components at a mix ratio adapted to produce the coating when mixed at the mixing element. As such, the tool head of this embodiment is configured to combine and mix different components into a coating using independently variable mix ratios, thereby making the tool head able to dispense many different types of coatings that may be used to build and/or repair wind turbine blades.

In one embodiment, the control system varies the speed of the independent actuators to vary a flow rate of coating being dispensed onto the spreading tool. The flow rate is adjusted in accordance with a movement speed of the spreading tool so as to continuously apply the coating onto the spreading tool during operation of the coating applicator tool head.

In another embodiment, the independent actuators of the drive are pistons each configured to move relative to one of the chambers to force flow of the associated component out of the chamber and into the mixing element. The drive would include independently actuated motors engaged with each of the pistons. The mixing element is defined by a static mixer configured to mix the different components as the different components flow through an elongate length of the static mixer.

In a further embodiment, the spreading tool includes a spatula including a flexible extrusion plate and one or more spacers positioned proximate the inner surface of the extrusion plate. The extrusion plate includes a front edge, a rear edge, opposed side edges, an outer surface, and an inner surface. The extrusion plate further includes a central region defined by a central axis. The one or more spacers are configured to define a gap between an outer surface of the wind turbine blade and the inner surface of the extrusion plate for dispensing of a coating material. The applicator tool further includes a feed tube for supplying the coating material to the spatula. The spatula is configured to shape the coating material into a coating over a damaged area of the wind turbine blade.

The one or more spacers define a height profile that generally corresponds to the shape of the coating from the applicator tool. By way of example, the height profile may have a maximum adjacent the central region of the extrusion plate and decay to substantially zero adjacent the side edges of the extrusion plate. In one embodiment, the extrusion plate may be movable relative to the one or more spacers. For example, the extrusion plate may be slidable relative to the one or more spacers. The relative movement between the extrusion plate and the one or more spacers is configured to vary the height profile.

In one embodiment of the spatula equipped spreading tool, the one or more spacers include a plurality of ribs coupled to the inner surface of the extrusion plate and extend from the front edge toward the rear edge, wherein the plurality of ribs defines grooves between adjacent ribs. The plurality of ribs may be integrally formed with the extrusion plate in this embodiment. The plurality of ribs may be positioned on the inner surface of the extrusion plate about the central region and the regions of the inner surface adjacent the side edges may be void of the ribs. In one aspect, a height of the plurality of ribs may vary across the extrusion plate and the plurality of ribs may be symmetric about the central axis. In an exemplary embodiment, the height of the plurality of ribs may be at a maximum adjacent the central region of the extrusion plate and decrease in height away from the central region and toward the side edges.

In another embodiment of the spatula equipped spreading tool, the one or more spacers include one or more spines having a front edge, a rear edge, an upper edge, and a lower edge. The lower edge may be angled relative to the upper edge by an acute angle, and the lower edge may be configured to engage the outer surface of the wind turbine blade during use. In this embodiment, the extrusion plate is separate from the one or more spines and is also movable relative to the one or more spines. The one or more spines may be positioned proximate the inner surface of the extrusion plate about the central region and the one or more spines may extend in a direction generally parallel to the central axis. In one embodiment, the extrusion plate may be coupled to a rigid support, the one or more spines may be coupled to the feed tube, and the rigid support may be slidable relative to the feed tube.

In a yet a further embodiment, the spreader tool is a roller brush rotatably coupled to the frame and mounted on the frame at opposing ends in such a manner to enable free rotation relative to the frame. Rotation of the roller brush is actuated by movement of the coating applicator tool head by the articulated arm back and forth along the surfaces of the wind turbine blade.

Embodiments of the present invention are further directed to a method for automatically repairing damage around a leading edge of a wind turbine blade. The method includes coupling a coating applicator tool head to an articulated arm of a robotic maintenance device that has been positioned along the leading edge of the wind turbine blade such that the articulated arm can move the coating applicator tool head into position around a location containing damage on the blade. The method also includes actuating a drive associated with a supply container operatively connected with the tool head to move independent actuators of the drive relative to corresponding chambers of the supply container which contain different components that can be mixed together to form a coating for the wind turbine blade. The actuation of the drive delivers a flow of the different components into a mixing element, which then mixes the flow of the different components to produce a flow of the coating which is delivered to a spreading tool. The method further includes moving the coating applicator tool head with the articulated arm so that the spreading tool moves along surfaces of the blade to apply layers of the coating to the surfaces of the blade, thereby covering and repairing the damage on the blade. The independent actuators of the drive are controlled to move at independently adjustable speeds to supply the different components at a desired mix ratio adapted to produce the coating when mixed at the mixing element.

In one embodiment, the method includes varying a speed of the independent actuators of the drive to vary a flow rate of the coating being delivered to the spreading tool. The flow rate is adjusted in accordance with a movement speed of the spreading tool so as to continuously apply the coating onto the spreading tool during operation of the tool head.

In one embodiment the spreading tool includes a spatula including a flexible extrusion plate and one or more spacers positioned proximate the inner surface of the extrusion plate. The extrusion plate includes a front edge, a rear edge, opposed side edges, an outer surface, and an inner surface. The extrusion plate further includes a central region defined by a central axis. The one or more spacers are configured to define a gap between an outer surface of the wind turbine blade and the inner surface of the extrusion plate for dispensing of a coating material. The applicator tool further includes a feed tube for supplying the coating material to the spatula. The spatula is configured to shape the coating material into a coating over a damaged area of the wind turbine blade. The method includes engaging the applicator tool to the outer surface of the wind turbine blade; supplying the coating material to the applicator tool; moving the applicator tool along the outer surface of the wind turbine blade; and dispensing the coating material from the applicator tool to form the coating over the damaged area of the wind turbine blade.

In another embodiment, the spreading tool is a roller brush rotatably coupled to the frame and the tool head further includes a nozzle located adjacent the roller brush and connected to the mixing element to receive the flow of the coating. In such an embodiment, the method further includes spreading the flow of the coating with the nozzle along a width of the roller brush, and dispensing the flow of the coating directly from the nozzle onto the roller brush while the roller brush is rolled along the surfaces of the wind turbine blade. For example, the step of dispensing may include dispensing a higher dispense flow rate of the coating onto a center of the roller brush than at opposite ends along the width of the roller brush.

In yet another embodiment, the method includes applying heat energy and/or light towards the coating after application on the surfaces of the blade to help cure and solidify a repaired area covered by the coating.

In a further embodiment, the tool head includes a drain container connected to the mixing element and a valve operatively connected to the mixing element, the drain container, and the spreading tool. The method then further includes controlling the flow of the coating with the valve to initially be directed from the mixing element into the drain container until a mixing rate of the different components has reached a desired threshold, and actuating the valve to switch the flow of the coating to be directed from the mixing element to the spreading tool after the mixing rate has reached the desired threshold.

The steps and elements described herein can be reconfigured and combined in many different combinations to achieve the desired technical effects in different styles of wind turbines, as may be needed in the art.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

8 to highlight the coating applicator tool head that may be coupled to the articulated arm.

Figure 4:
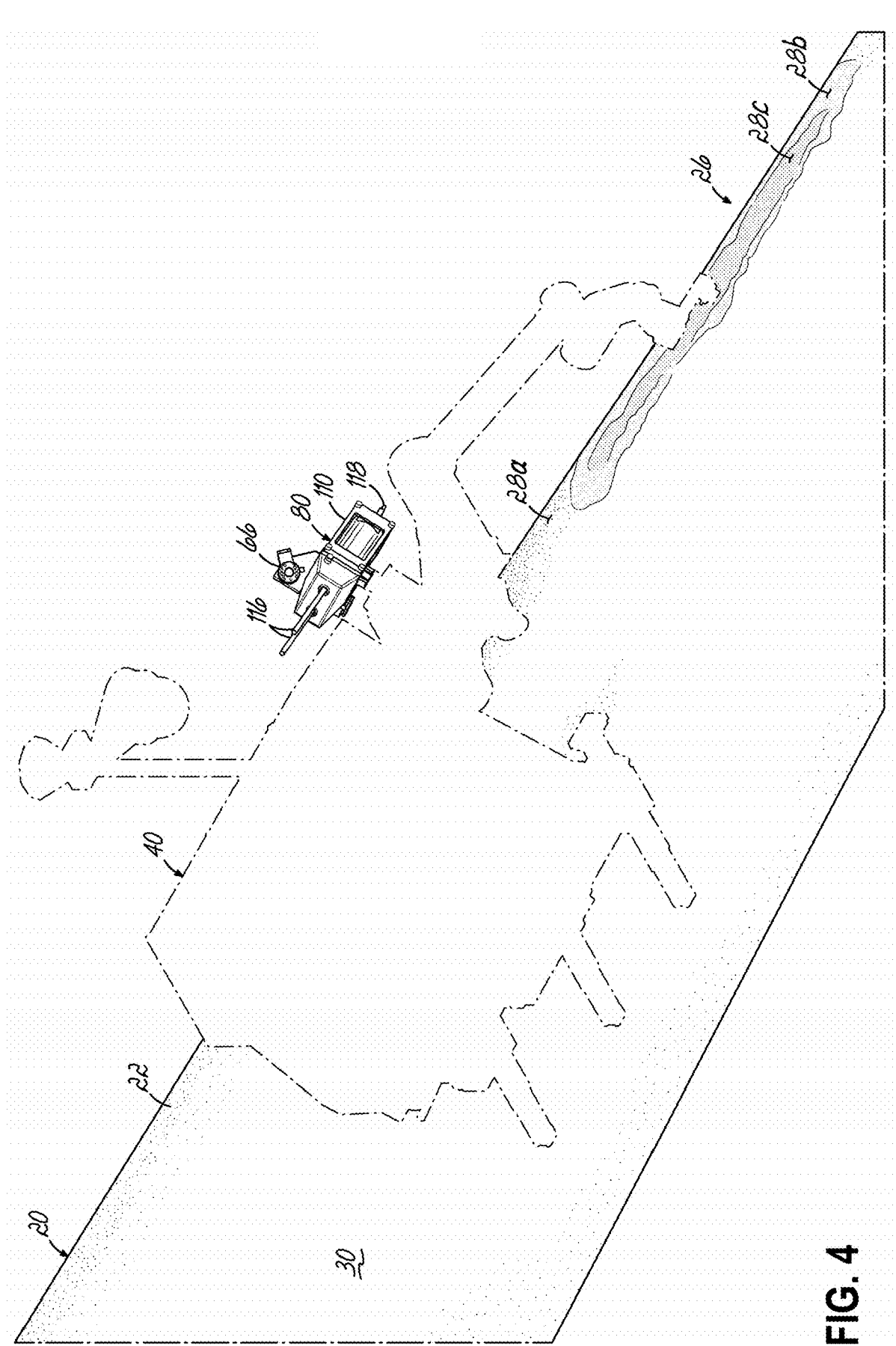
FIG. 4 is a top perspective view similar to FIG. 3 but with most of the robotic maintenance device shown in phantom
Figure 5:
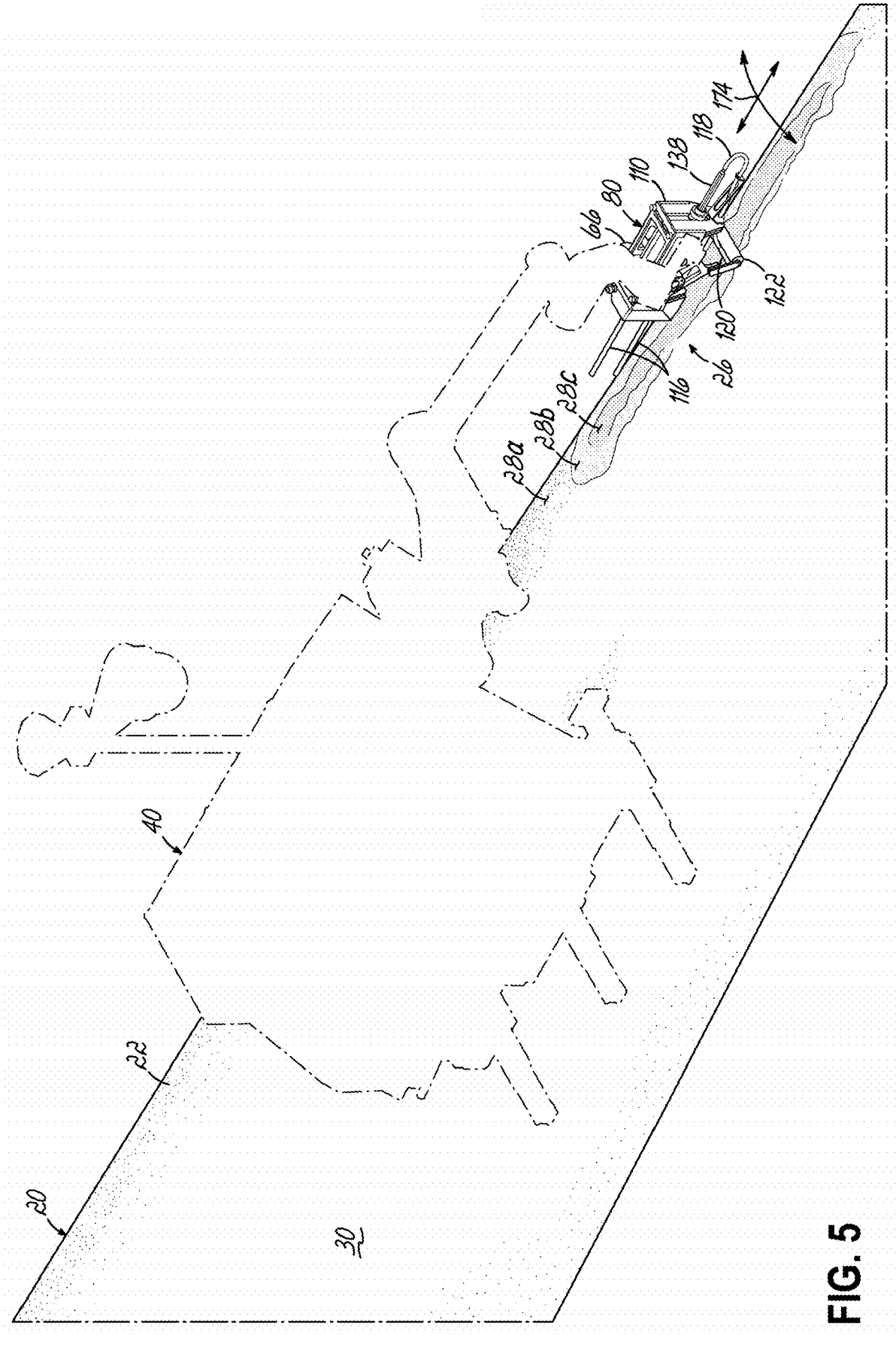

FIG. 5 a top perspective view similar to FIG. 4 after the articulated arm is connected to the coating applicator tool head, showing the coating applicator tool head in use to apply layers of coating to the leading edge of the wind turbine blade to repair the damage.

Figure 6:
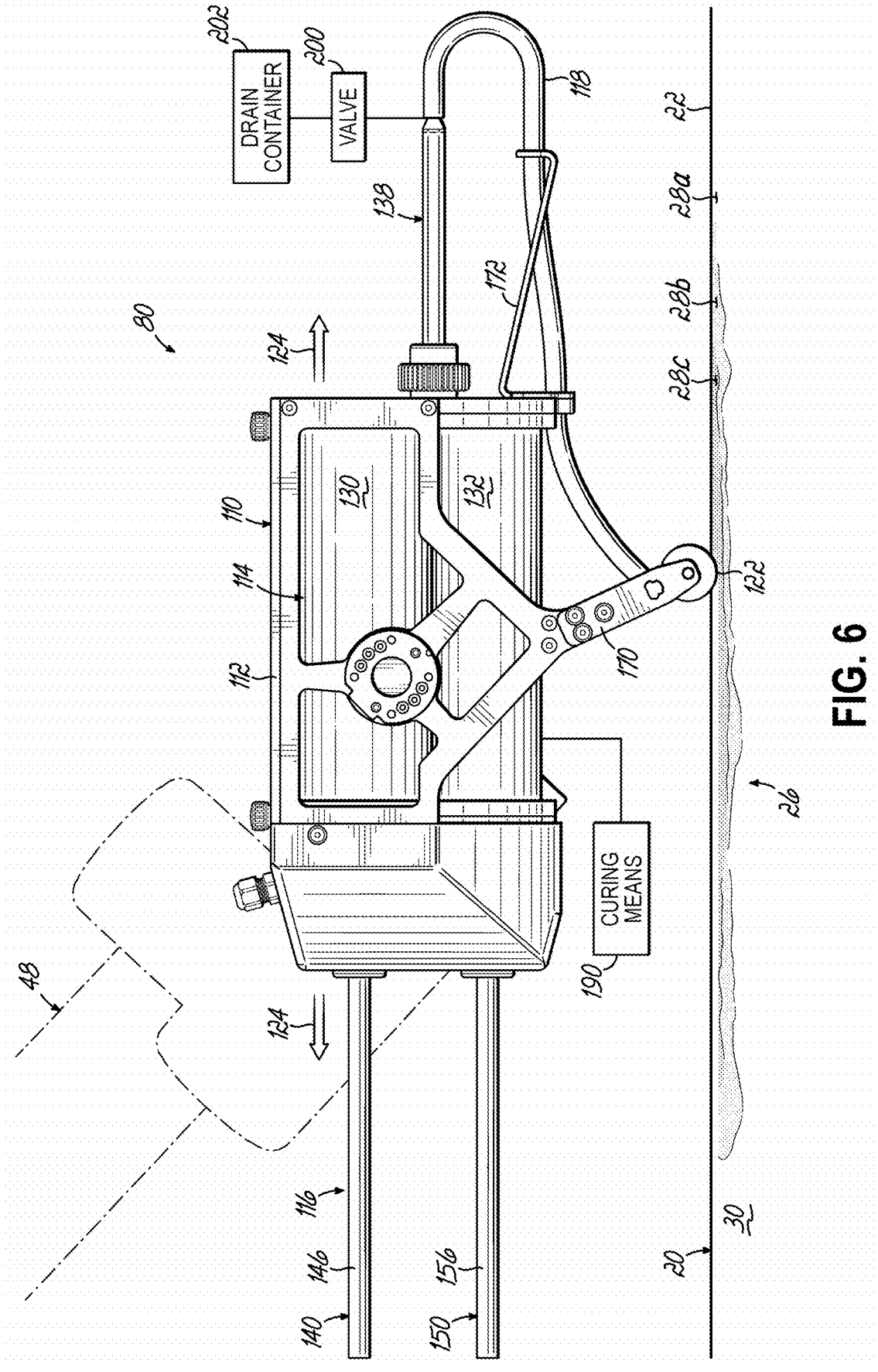

FIG. 6 is a side view of the coating applicator tool head of FIG. 5 shown during operation to apply coating to the damage on the wind turbine blade.

Figure 7:
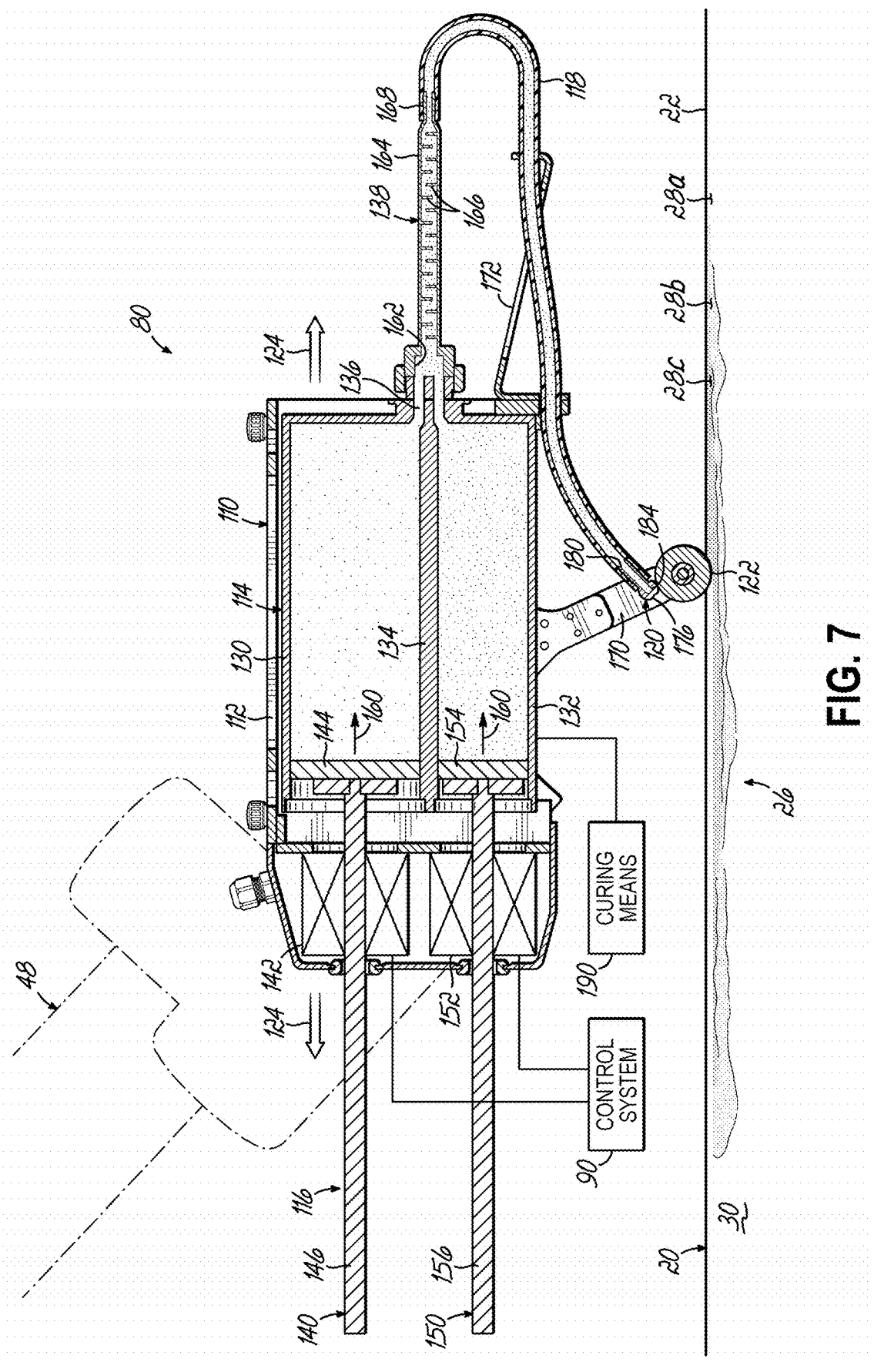

FIG. 7 is a cross-sectioned side view of the coating applicator tool head of FIG. 6, showing several internal features thereof.

Figure 8:
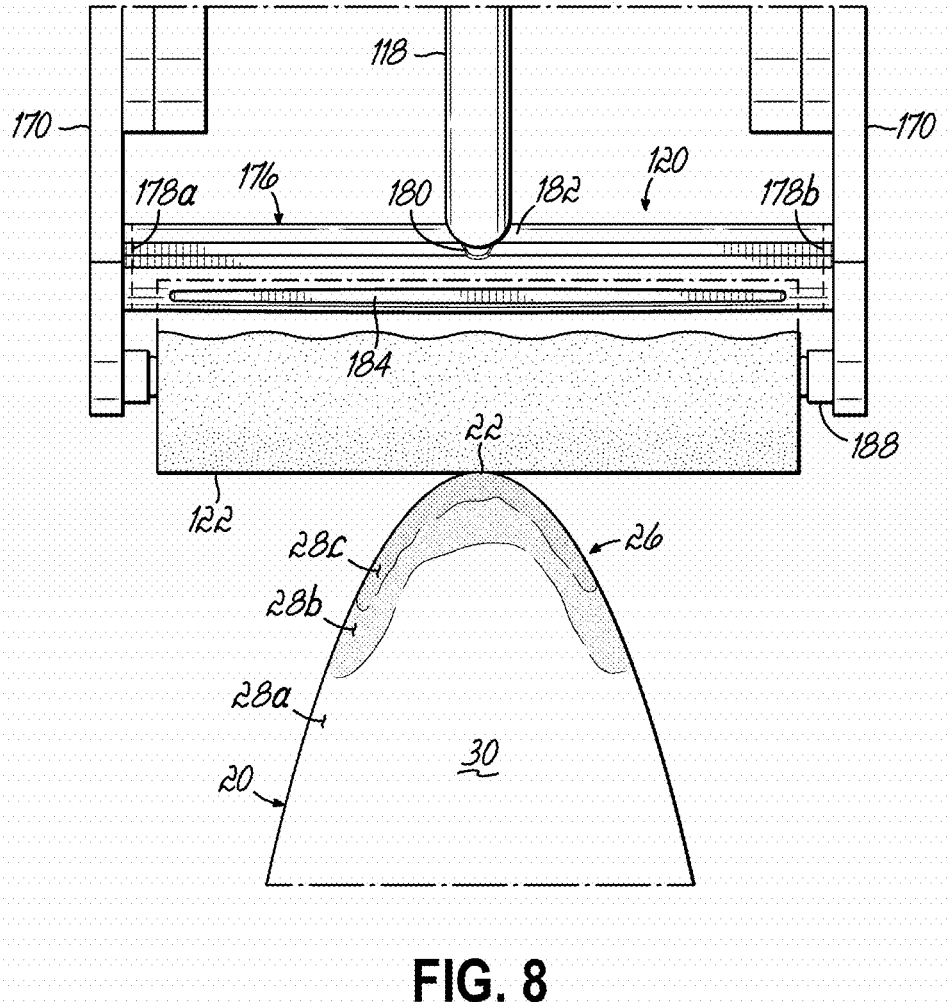

FIG. 8 is a front detail view of a nozzle and a roller brush of the coating applicator tool head of FIG. 5, with a portion of the roller brush shown in phantom to reveal further details of the nozzle in operation.

Figure 9:
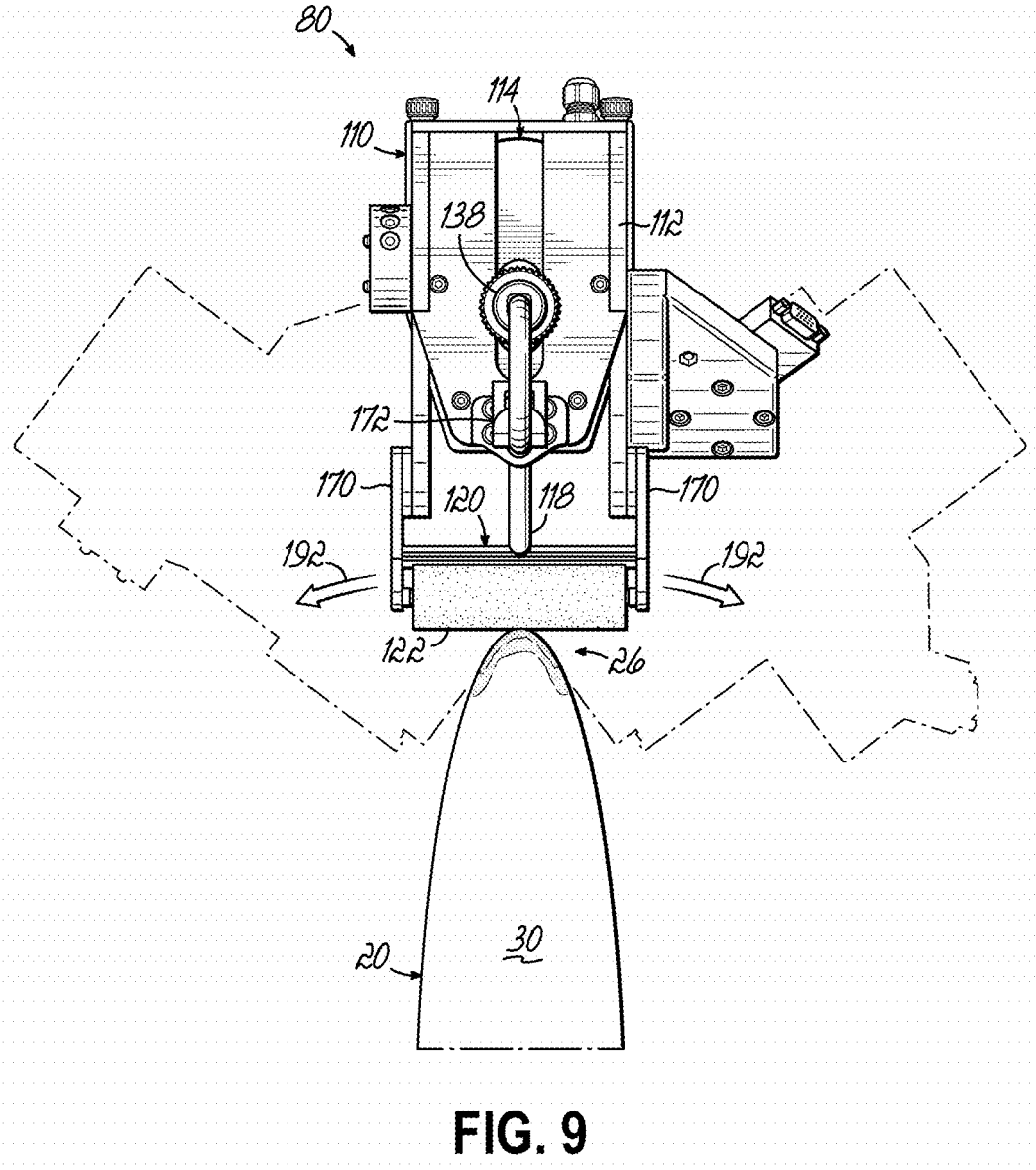

FIG. 9 is a front view of the coating applicator tool head of FIG. 5, again showing the coating applicator tool head in use at the wind turbine blade.

Figure 2:
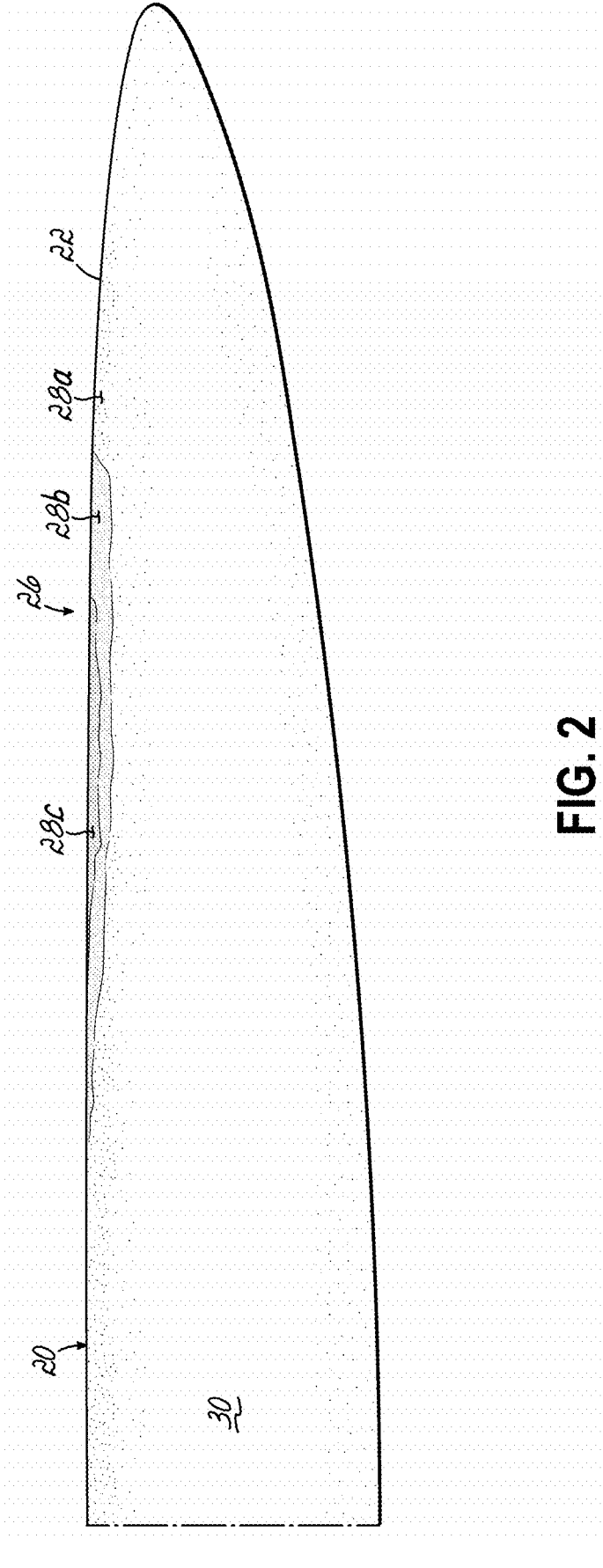
FIG. 2 is a front view of a wind turbine blade of the wind turbine of FIG. 1, showing various levels of erosion-type damage along a leading edge that is pitched upwardly.
Figure 10:
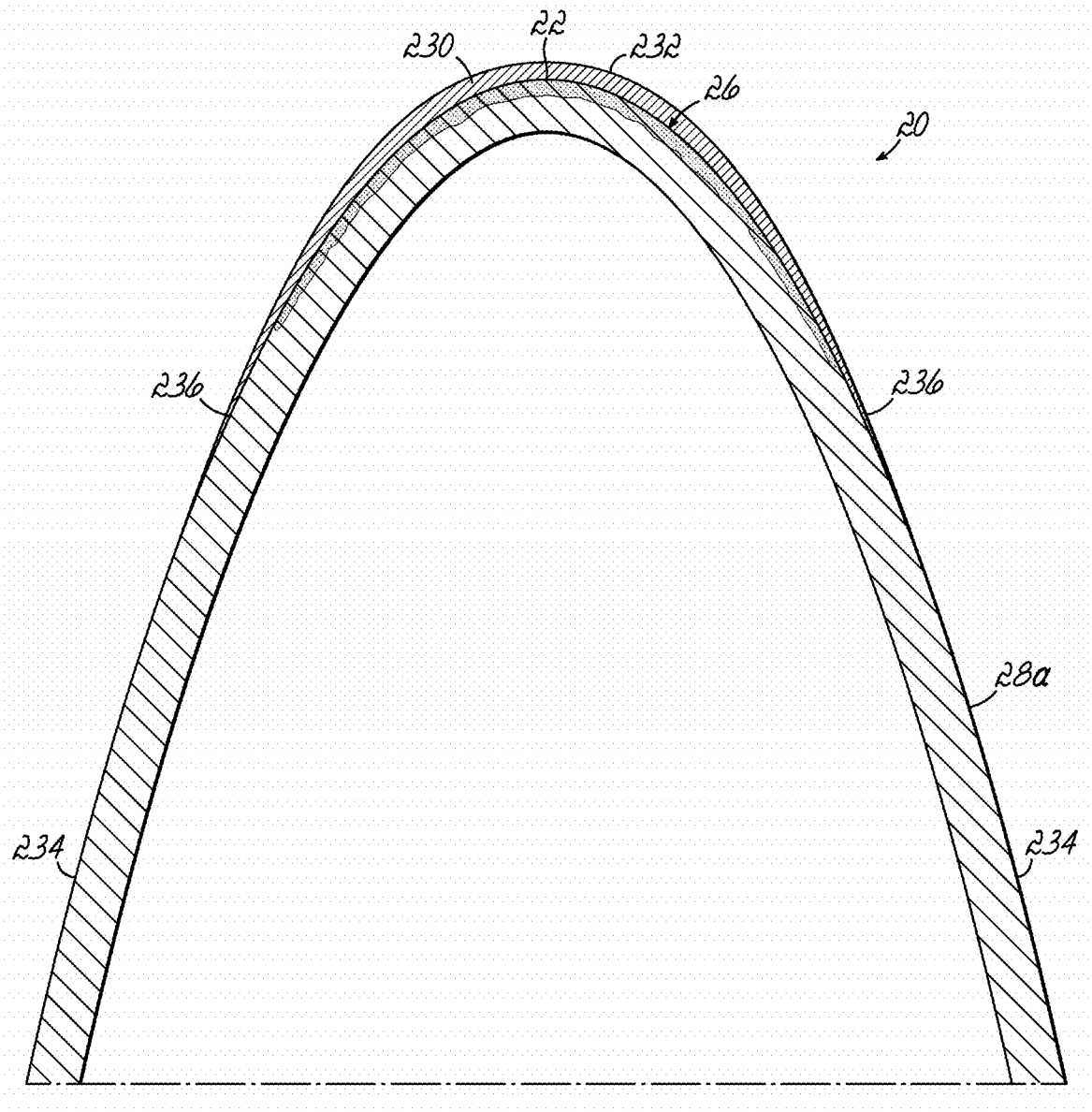
Figure 11:
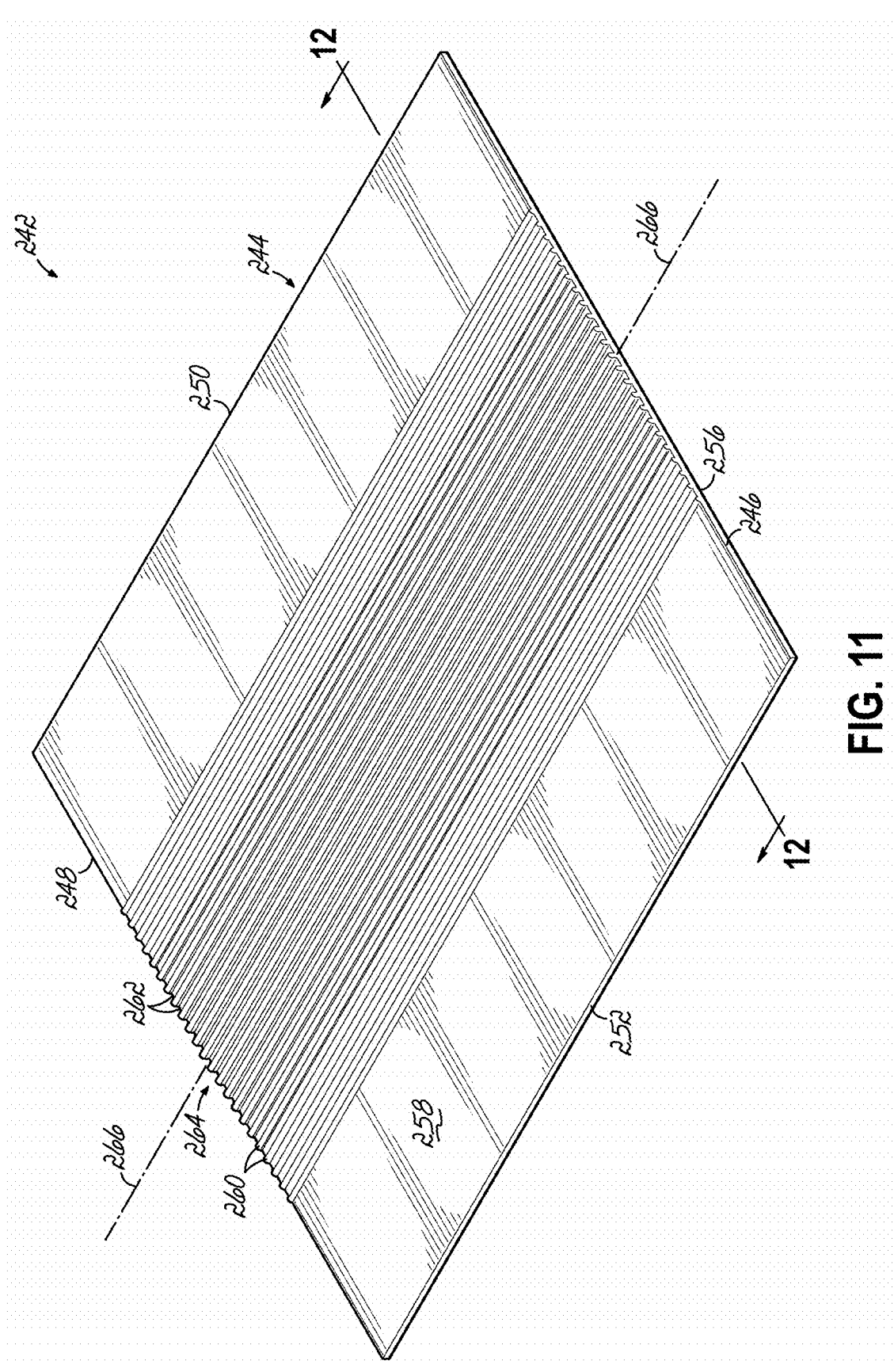
Figure 12:
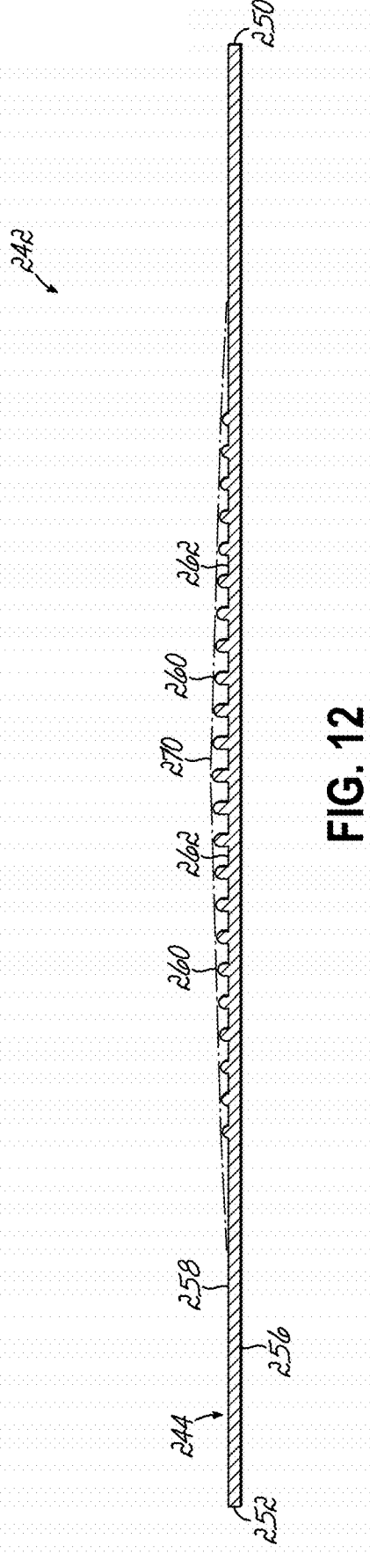
Figure 13:
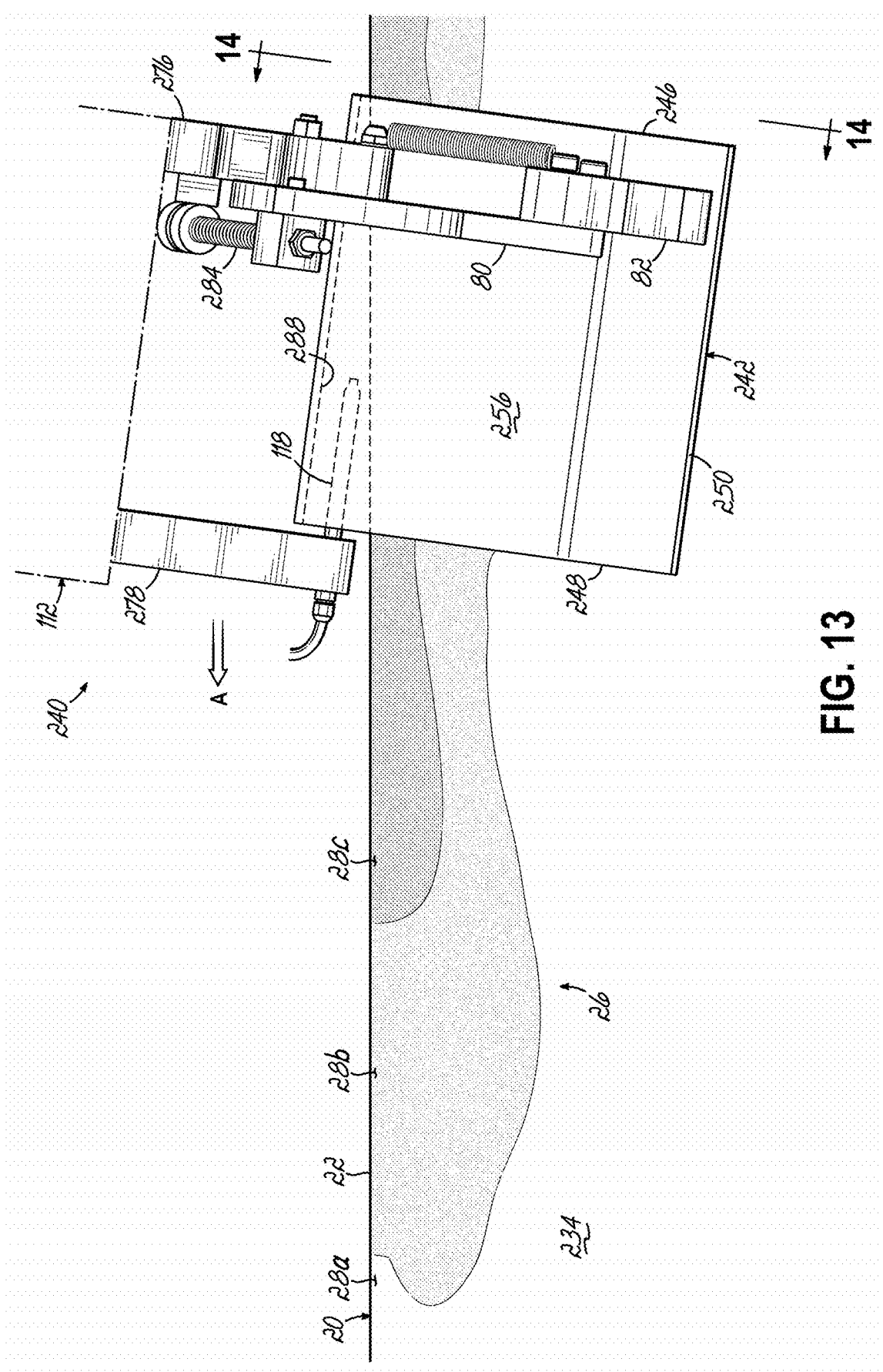
Figure 14:
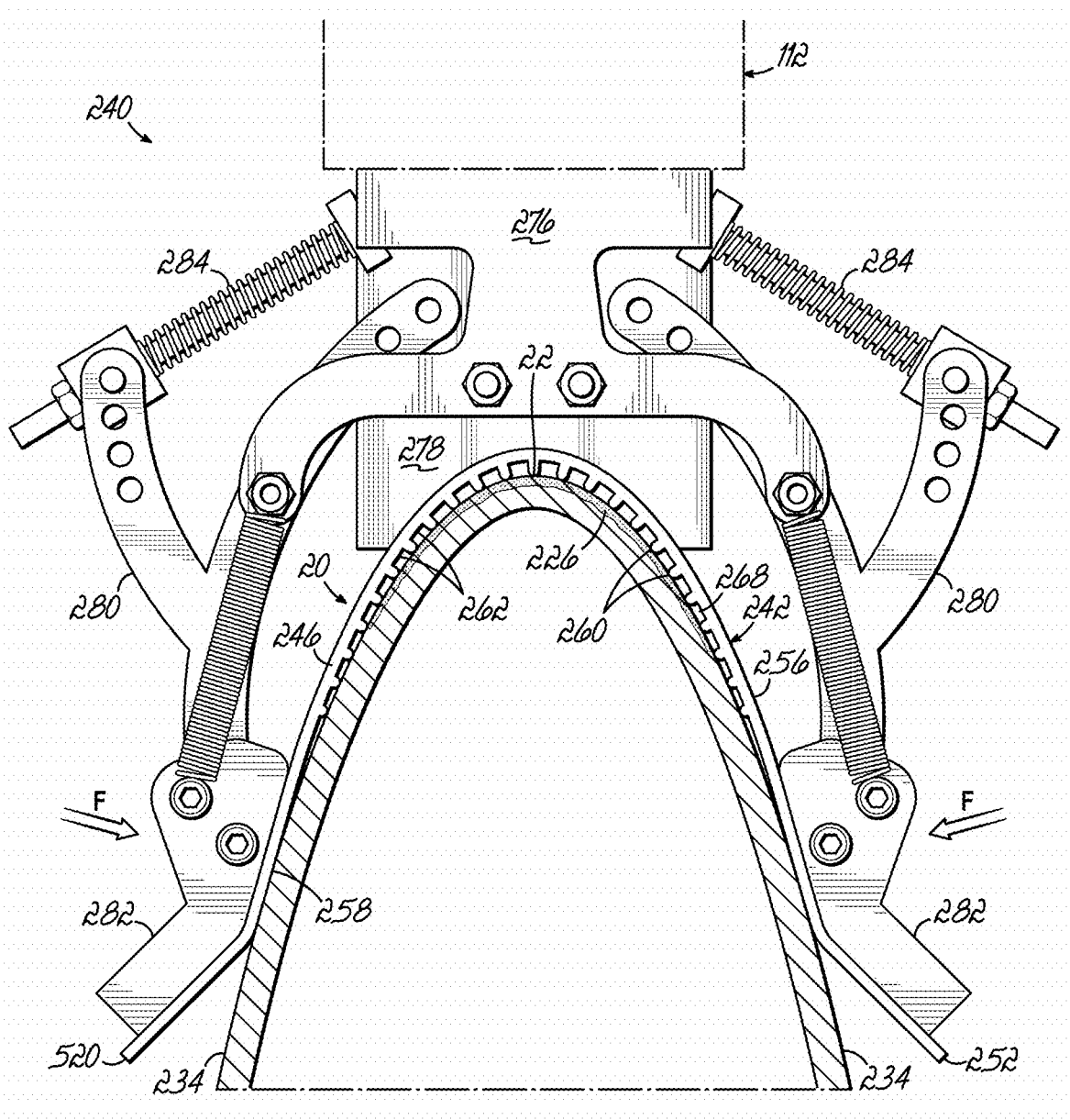
Figure 15:
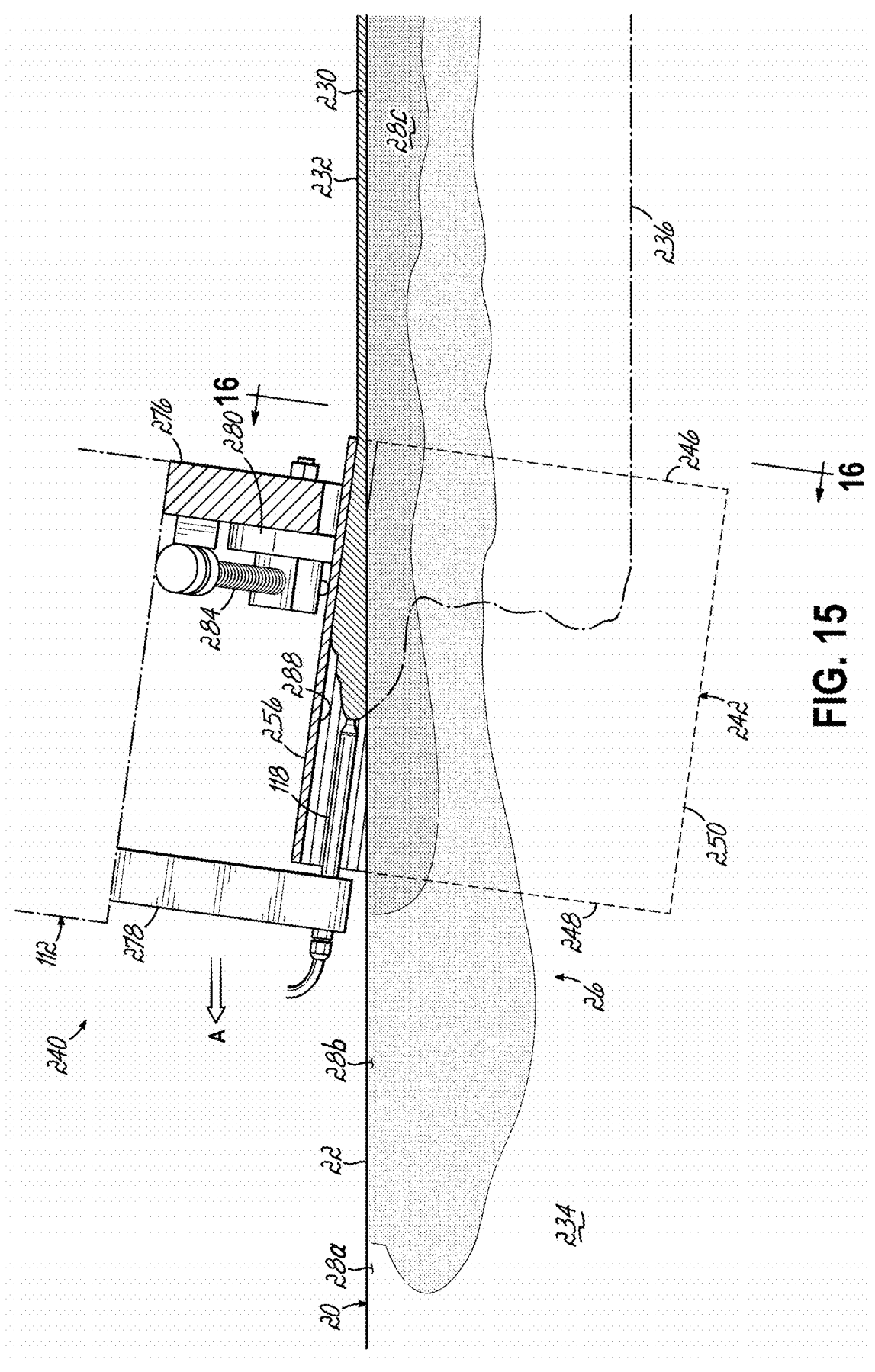
Figure 16:
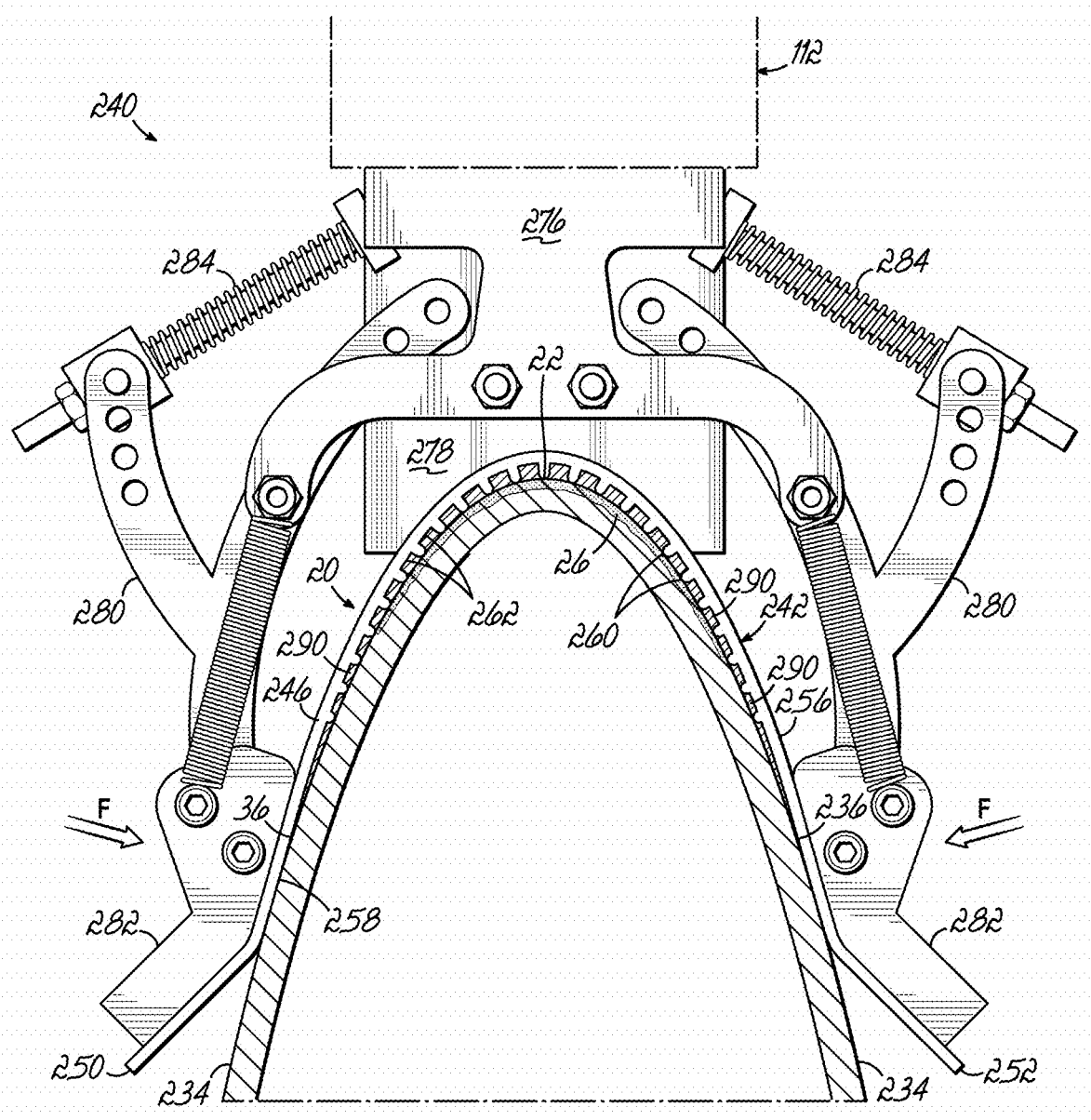
Figures 17, 18:
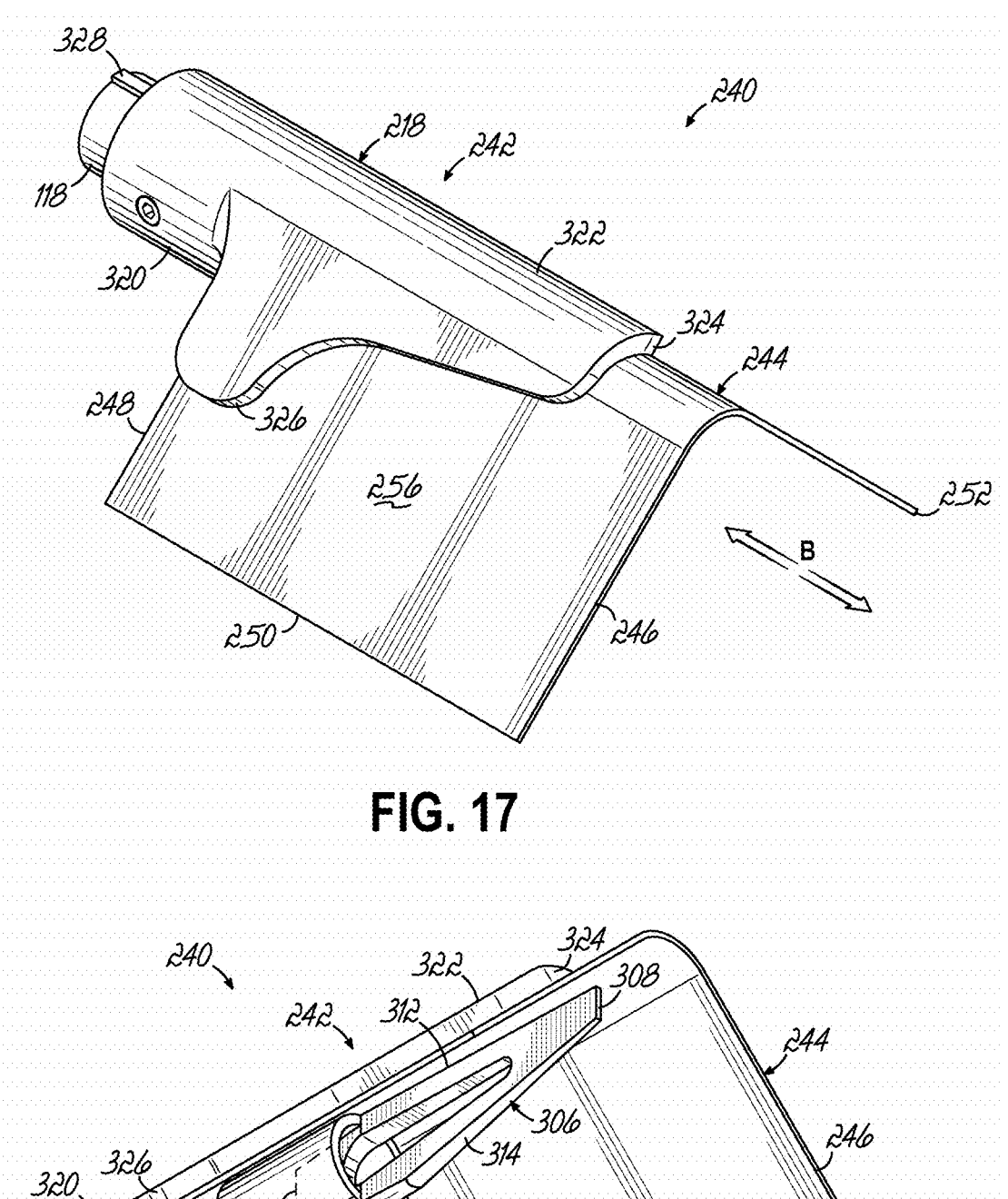
Figure 19:
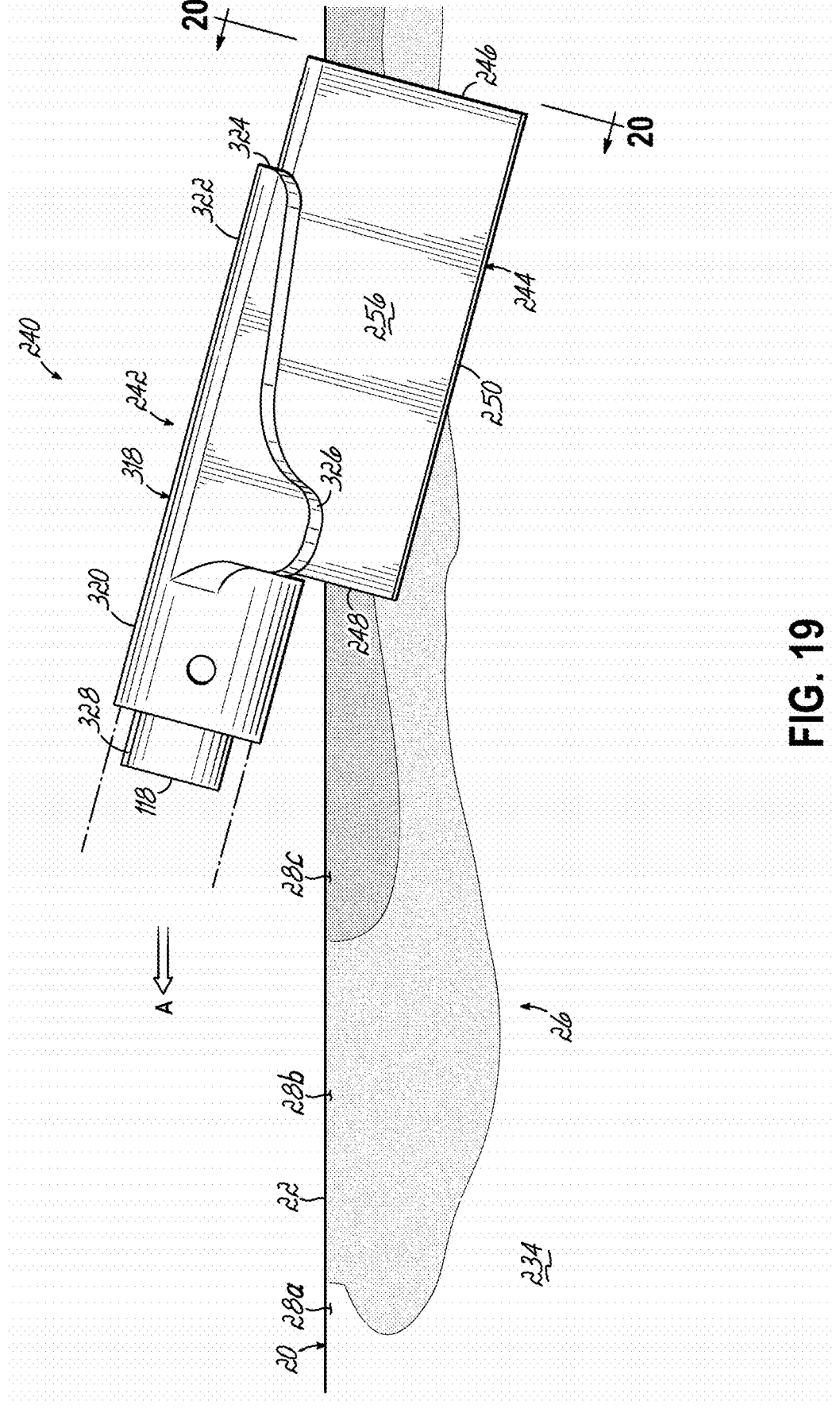
Figure 20:
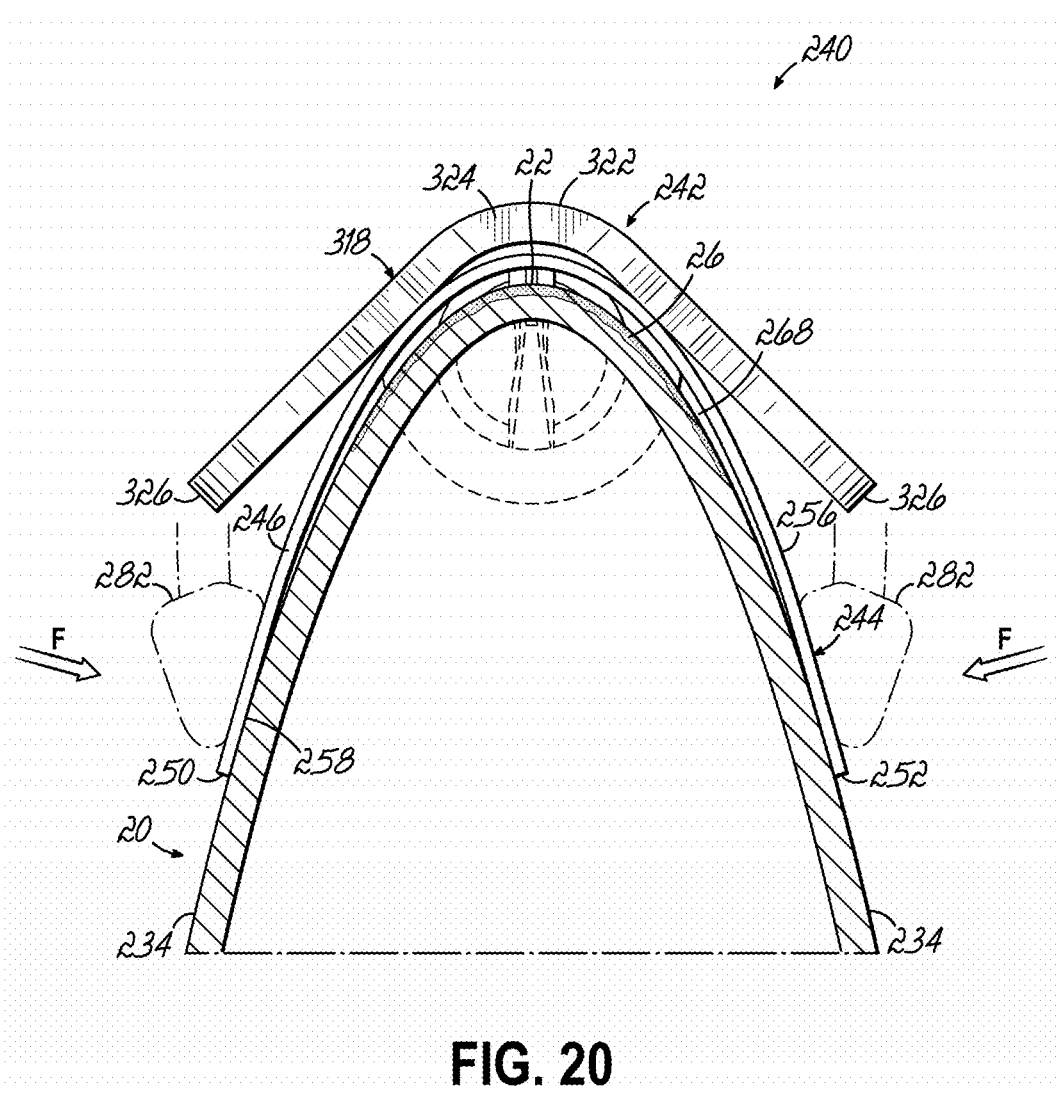
Figure 21:
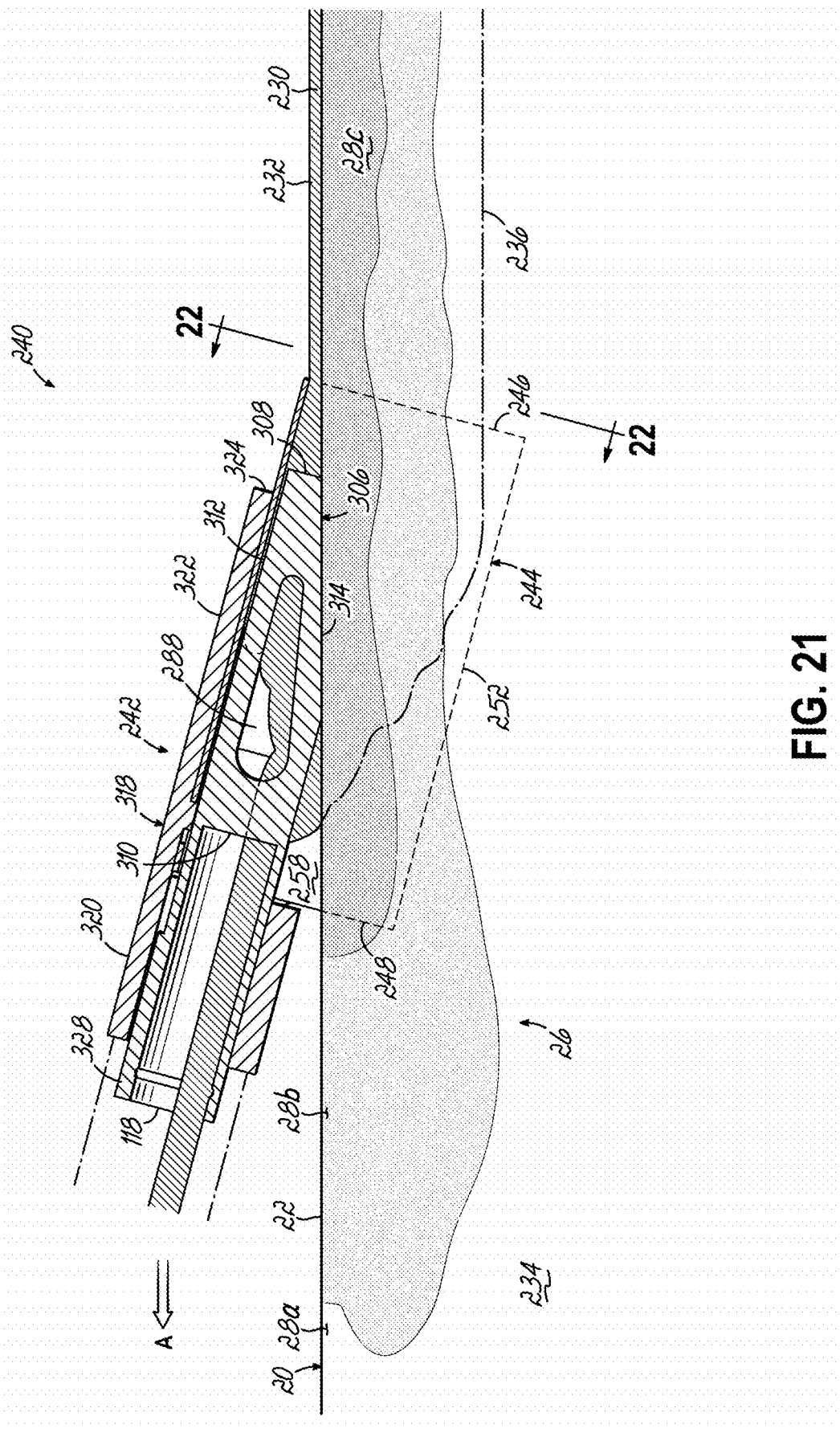
Figure 22:
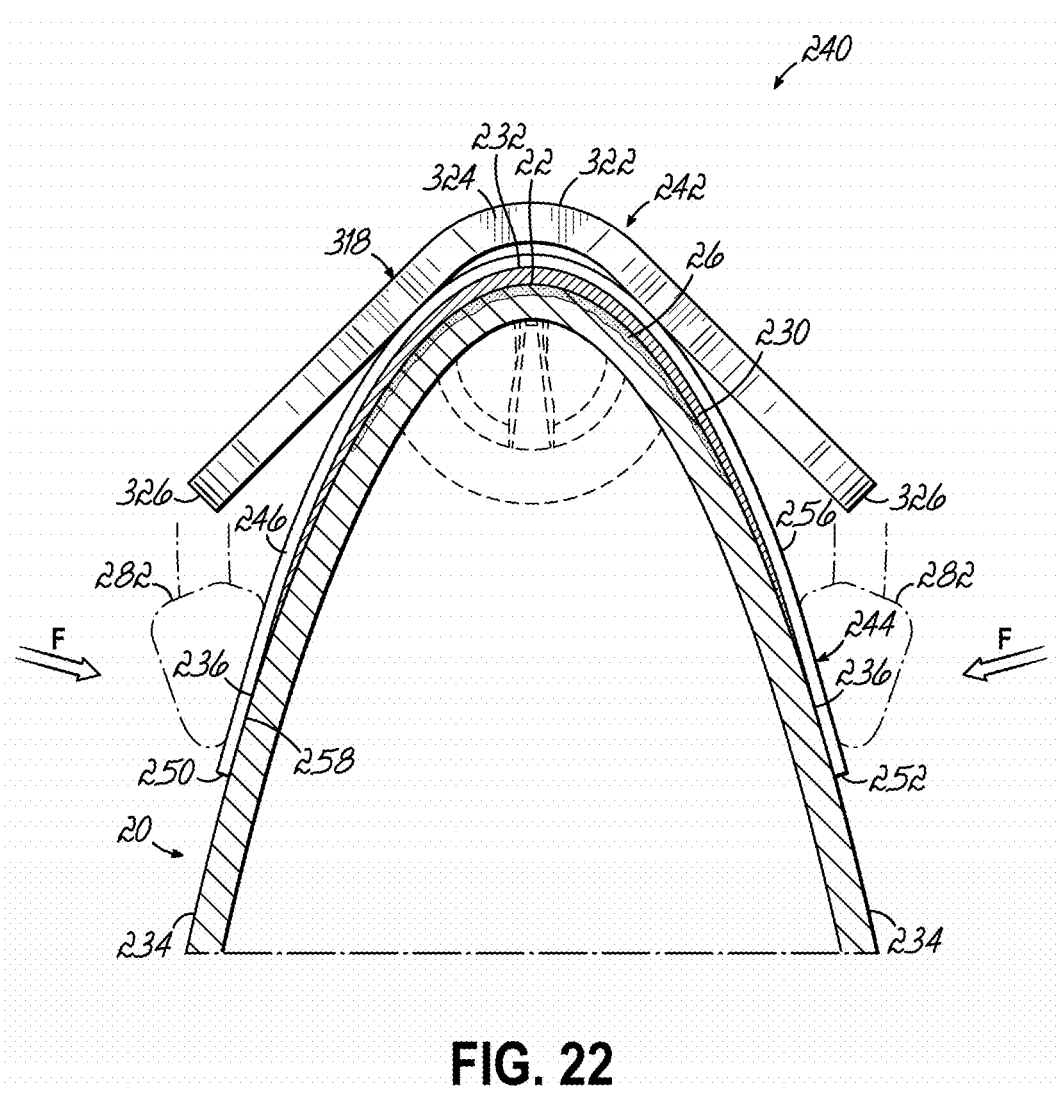
Figure 23:
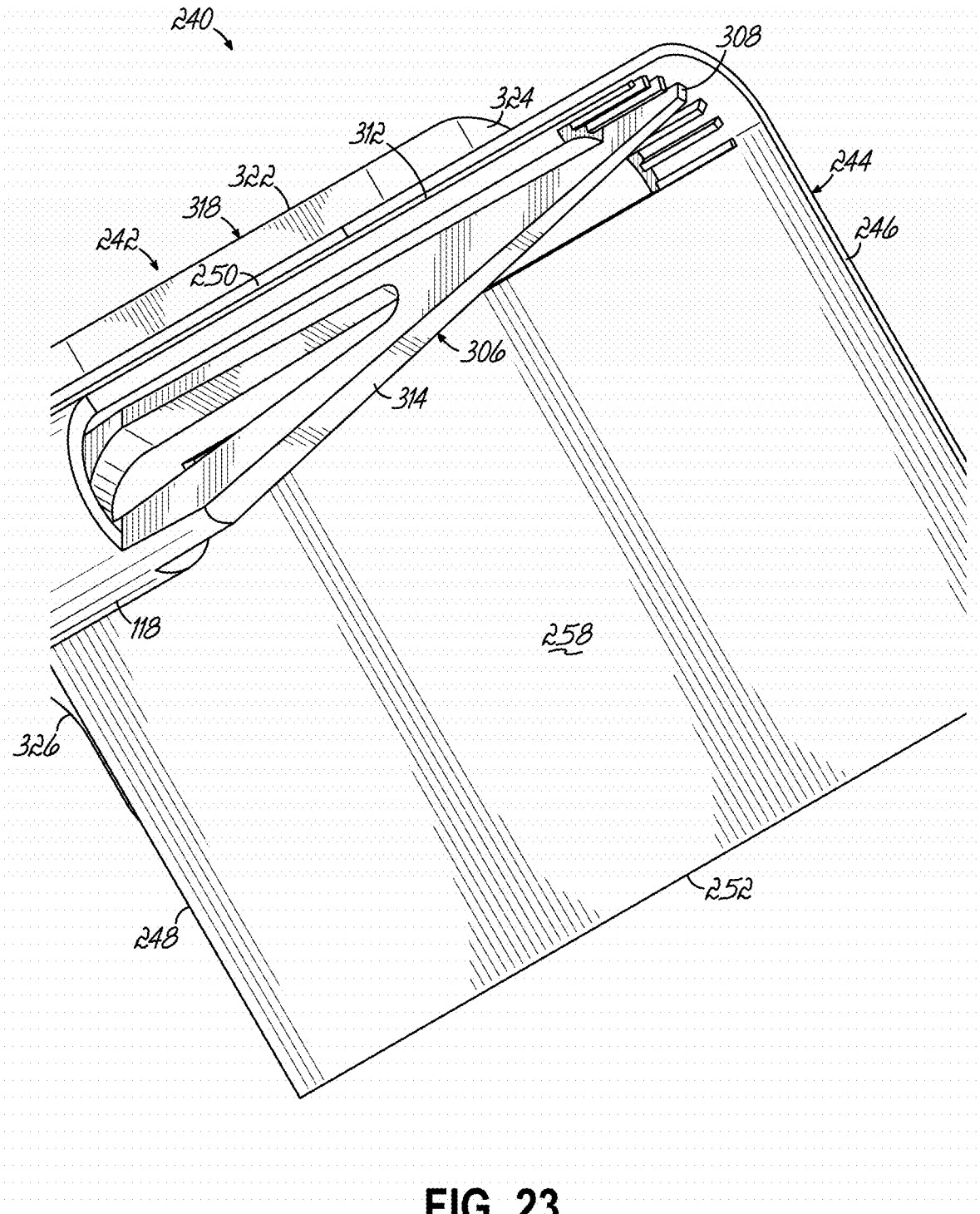

FIG. 10 is a cross-sectional view of the wind turbine blade shown in FIG. 2 with a coating applied over the damaged region on the leading edge of the blade;

FIG. 11 is a perspective view of a spatula of an applicator tool;

FIG. 12 is a front elevation view of the spatula shown in FIG. 11;

FIG. 13 is a side elevation view of an applicator tool with the spatula of FIG. 11 being used to repair damage to the leading edge of the wind turbine blade;

FIG. 14 is a cross-sectional view through the arrangement shown in FIG. 13 taken generally along line 14-14;

FIG. 15 is another cross-sectional view of the arrangement shown in FIG. 13;

FIG. 16 is a cross-sectional view through the arrangement shown in FIG. 15 taken generally along line 16-16;

FIG. 17 is a top perspective view of a spatula of an applicator tool;

FIG. 18 is a bottom perspective view of the spatula shown in FIG. 17;

FIG. 19 is a side elevation view of an applicator tool with the spatula of FIG. 17 being used to repair damage to the leading edge of the wind turbine blade;

FIG. 20 is a cross-sectional view of the arrangement shown in FIG. 19 taken generally along line 20-20;

FIG. 21 is another cross-sectional view through the arrangement shown in FIG. 19;

FIG. 22 is a cross-sectional view through the arrangement shown in FIG. 21 taken generally along line 22-22; and FIG. 23 is a partial perspective view of a spatula of an applicator tool.

DETAILED DESCRIPTION

With reference to FIGS. 1 through 23, embodiments of a coating applicator tool head configured to be used with a robotic maintenance device and a method for automatically repairing damage around a leading edge of a wind turbine blade are shown in detail. The maintenance device also uses a new advantageous method for repairing so-called category-1 and category-2 damage to the outer coatings of a wind turbine blade, and the method can include scanning the blade to image the damaged area, sanding down a surface of the blade around the damaged area and cleaning the same, and then applying one or more layers of coating by painting or the like to repair the damage. This method produces a high quality and precise repair, once again helping minimize operational downtime, while also avoiding the need for rope access technicians and the associated safety and timing problems of manual repairs. The coating applicator tool head allows for multi-component coatings to be mixed in varying ratios and then applied as needed to make the repair on a given wind turbine blade.

In some embodiments, the applicator tool includes a spatula for shaping the coating material on the leading edge of the wind turbine blade as the applicator tool is moved along the blade. The spatula is configured to apply a uniform and even coating of material that in cross section is generally thickest adjacent the leading edge of the blade and decreases in thickness in a generally continuous and smooth manner along the upper and lower surfaces of the blade and in a direction toward a trailing edge of the blade. In this way, the coating may smoothly merge with the existing blade surfaces at locations away from the leading edge. The shape of the coating material applied by the applicator tool is configured to repair adequately the damaged area of the blade while also minimizing aerodynamic disruptions of the air flow over the blade. Thus, a repair is achieved with minimal impact on the aerodynamic performance of the blade. The spatula and associated method produce a high quality and precise repair of the damaged area of the wind turbine blade that overcomes many of the drawbacks of existing repair devices and processes.

Moreover, in some embodiments the coating applicator tool head dispenses the coating directly onto a roller brush that is moved with the tool head to apply the coating to the blade surface, thereby reliably applying the coating to repair the blade damage according to the overall maintenance method described above. Other advantages and effects of the embodiments of this invention will be evident from the following description.

Throughout this application, the correction of erosion damage on wind turbine blades is typically referred to as a "repair" of those damages. In some contexts, "damage" refers to more significant damages to the blade (perhaps beyond what is described as "category-1" and "category-2" damage herein), and so the operation of the maintenance device may be deemed a routine maintenance action that occurs before a blade is "damaged" in such contexts. In this regard, the maintenance device is capable of providing preventative maintenance to remove wear and erosion effects before such effects cause "damage" that must be repaired on the wind turbine blade, and the maintenance device is also capable of providing more thorough repairs after damage is caused on the blade.

Figure 1:
FIG. 1 is a perspective view of a wind turbine according to one embodiment of the invention.

Turning with reference to FIG. 1, a wind turbine 10 is shown to include a tower 12, a nacelle 14 disposed at the apex of the tower 12, and a rotor 16 operatively coupled to a generator (not shown) housed inside the nacelle 14. The rotor 16 of the wind turbine 10 includes a central hub 18 and a plurality of wind turbine blades 20 that project outwardly from the central hub 18 at locations circumferentially distributed around the hub 18. As shown, the rotor 16 includes three wind turbine blades 20, but the number of blades 20 may vary from one wind turbine to another. The wind turbine blades 20 are configured to interact with air flow to produce lift that causes the rotor 16 to spin generally within a plane defined by the wind turbine blades 20. As the rotor 16 spins, the wind turbine blades 20 pass through the air with a leading edge 22 leading the respective wind turbine blade 20 during rotation. The wind turbine blades 20 in use are spaced apart from the ground surface by a significant distance, which normally renders maintenance and repair actions difficult. However, the coating applicator tool head and the associated robotic maintenance device of this invention improves the repair process to make same easy and less time-consuming as will be set forth in detail below.

As the wind turbine 10 ages, one or more of the wind turbine blades 20 may experience erosion from prolonged, continuous exposure to the environment. One example of such erosion damage 26 is shown in FIG. 1 and better shown in the detailed view of FIG. 2. While not being particularly limited to any source, erosion damage 26 may occur due to particulates in the air that abrade the leading edge 22 of the wind turbine blade 20 during operation. Erosion therefore may occur in an erosion zone that includes the leading edge 22, but it may also occur in other areas in the surface 30 of the blade 20. Accordingly, while the robotic maintenance device is configured to repair damage and move along the leading edge 22, this device is also capable of conducting maintenance and repair actions anywhere along the outer surface of the blades 20.

Erosion damage 26 is generally characterized as a loss of material from the wind turbine blade 20. Material loss may be uniformly distributed but is often non-uniform across the leading edge 22 or any other surface of the wind turbine blade 20. Rather than losing a uniform skin of material from a surface, erosion may include localized surface imperfections, such as random pitting and shallow gouges or crack-like features that may be a result of localized, connected pitting (as a result of impacts with debris or other matter in the environment). In any case, if erosion damage 26 is not repaired in a timely fashion, the wind turbine blade 20 becomes less efficient at rotating the rotor 16 and ultimately, the structural integrity of the wind turbine blade 20 may be significantly impaired. With reference to the detailed view in FIG. 2, it will be understood that the erosion damage 26 may define differing levels of severity based on how deep the damage extends inwardly into the material layers defining the outer shell of the blade 20. In the example shown, the erosion damage 26 includes some areas with an erosion or cut of material through the outer topcoat layer into a second layer of material underneath the topcoat, which is categorized as a "category 1" level of severity, and further areas with an erosion or cut of material through the outer topcoat layer and the second later of material into a third layer of material underneath the second layer, which is categorized as a "category 2" level of severity. For reference, deeper cuts and erosions defining more significant damage is typically categorized at higher levels such as category 3, 4, or 5. In FIG. 2, the topcoat is shown at 28a, the revealed areas of second layer are shown at 28b, and the revealed areas of third layer are shown at 28c. These various layers 28a, 28b, 28c of material may be different in color, which can help with the identification of damage severity and repair confirmation after the repair is completed with the maintenance device. By identifying and correcting such lower levels of erosion damage 26 promptly, more significant damage of the blade 20 can be avoided along with higher operational downtime caused by the more significant damage.

Figure 3:
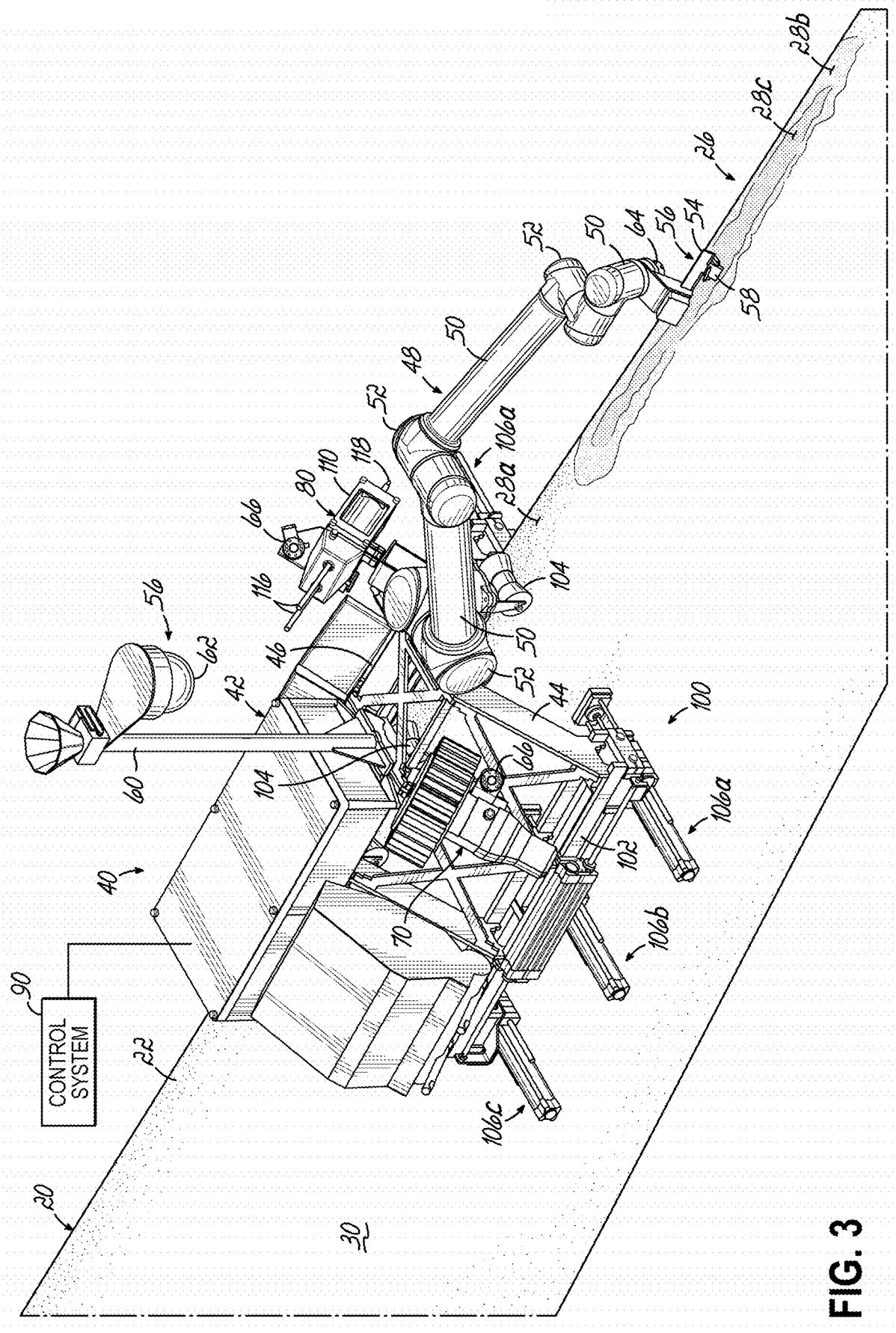
FIG. 3 is a top perspective view of a robotic maintenance device including a coating applicator tool head in accordance with embodiments of the present invention, the maintenance device being mounted in position on the leading edge of the wind turbine blade of FIG. 2 with an articulated arm moving over a surface containing the damage.

FIG. 3 provides an overview of the robotic maintenance device 40 that includes the coating applicator tool head 80 in accordance with embodiments of this invention. The maintenance device 40 includes a main body 42 having a first body portion 44 and a second body portion 46 extending towards opposite sides of the leading edge 22 of the blade 20 when the maintenance device 40 is mounted atop the leading edge 22 of the blade 20 as shown in this Figure. It will be appreciated that the wind turbine 10 is halted with the blade 20 to be worked upon in a generally horizontal orientation with the blade 20 pitched so that the leading edge 22 faces upwardly when the maintenance device 40 is placed upon the blade 20. The maintenance device 40 can be moved onto the blade 20 in various manners without departing from the scope of this invention, including by crane and/or by flying vehicle. The main body 42 generally defines a framework for other components of the maintenance device 40 to be mounted on, as set forth in the following description.

Along one end of the main body 42, an articulated arm 48 is connected to the main body 42 so as to project outwardly beyond a front of the remainder of the maintenance device 40. The articulated arm 48 is defined by a series of arm portions 50 connected together at rotational joints 52 in this embodiment. Movement of the arm portions 50 at the joints 52 enable a free end 54 of the articulated arm 48 to move all around the periphery and surface of the wind turbine blade 20. To this end the free end 54 is capable of accessing any portion on the surface of the blade 20 to conduct inspection or maintenance and repair actions in this embodiment (or any portion within the physical range defined by the articulated arm 48). The free end 54 of the articulated arm 48 also carries elements defining part of a vision system 56 for the maintenance device 40. For example, the vision system 56 may include a laser (not shown) and/or a scanning camera 58 configured to image the surface 30 in the vicinity of the leading edge 22 and/or damaged areas on the blade 20.

As also shown in FIG. 3, the maintenance device 40 also includes in this embodiment a mast 60 that projects upwardly from the main body 42 to a position well above the remainder of the maintenance device 40. The vision system 56 also includes an overview camera 62 mounted on the mast 60. The overview camera images the remainder of the maintenance device 40 to provide a complete overview of the operational status and actions of the maintenance device 40. Such an overview can be desirable when the maintenance device 40 is at least partially monitored or controlled from a location offsite, including on the ground surface rather than on the blade 20. More or fewer camera devices may be provided in other embodiments to allow for visual feedback to be provided to the maintenance device 40 and/or to an operator.

The main body 42 serves as a support for one or more tool heads that may be selectively engaged by the articulated arm 48 to conduct the necessary repair and maintenance actions. In the embodiment shown, two exemplary tool heads are provided on the maintenance device 40. The first is a cleaning/abrading tool head 70 that is configured to sand down the surface of the wind turbine blade 20 containing damage and then clean that surface to prepare it for repair. The second is the coating applicator tool head 80 that is configured to apply layers of coating material onto the surface of the blade 20 to fill in damaged areas and thereby repair the blade 20. The coating applicator tool head 80 is one of the principal aspects of this application and will be described in further detail with reference to FIGS. 4 through 9. It will be understood that the total number of tool heads located on the maintenance device 40 may vary in other embodiments without departing from the scope of the invention, as each tool head is designed to provide a certain functionality and such functionality needs may vary in different contexts and applications. The free end 54 of the articulated arm 48 includes an interface element 64 that can mechanically and electrically couple with corresponding interface elements 66 located on each of the tool heads 70, 80.

The maintenance device 40 also includes a control system 90 shown schematically in FIG. 3 and implemented on known hardware and software platforms. The control system 90 is operatively connected to the other portions of the maintenance device 40, including the articulated arm 48, the vision system 56, and a movement drive 100, to thereby operate these elements. The control system 90 is capable of responding to inputs from the vision system 56 and/or from an offsite operator to modify the actions taken by the maintenance device 40 based on the repair or maintenance needed on the blade 20.

The movement drive 100 is further illustrated in FIG. 3. As noted above, the main body 42 includes first and second body portions 44, 46 that extend towards opposite sides of the leading edge 22 of the blade 20 when the maintenance device 40 is mounted atop the leading edge 22. The movement drive 100 is defined by a plurality of elements located along longitudinal rails 102 extending along a length of the maintenance device 40 at the free ends defined by the first and second body portions 44, 46. Furthermore, in the position shown, a plurality of idler wheels 104 connected to an undersurface of the main body 42 between the first and second body portions 44, 46 sit directly on the leading edge 22 of the blade 20, two of such idler wheels 104 being visible in FIG. 3. The idler wheels 104 can freely rotate along the surface of the blade 20 in response to movements of the maintenance device 40 generated by the movement drive 100 as will be described. The idler wheels 104 help support a weight of the maintenance device 40 on the blade 20 such that the entire weight is not applied to the movement drive 100 and its elements. These idler wheels 104 may be formed from a plastics material or any other suitable material, typically a low-friction material to help avoid any damage upon engagement with the blade 20. The movement drive 100 includes a plurality of clamping actuators 106a, 106b, 106c that extend from the longitudinal rails 102 into selective clamped engagement with the opposite sides of the wind turbine blade 20. The idler wheels 104 and the clamping actuators 106a, 106b, 106c define the points of direct contact between the maintenance device 40 of this embodiment and the blade 20. It will be understood that only one idler wheel 104 or any number of idler wheels 104 may be provided in other embodiments.

In the embodiment shown in FIG. 3, the movement drive 100 includes three pairs of actuators in the plurality of clamping actuators 106a, 106b, 106c. To this end, the plurality of clamping actuators includes a front pair of clamping actuators 106a located at one longitudinal end of the main body 42, a middle pair of clamping actuators 106b, and a rear pair of clamping actuators 106c located at another longitudinal end of the main body 42. The middle pair of clamping actuators 106b is positioned between the front and rear pairs. The movement drive 100 is configured to move one pair of the clamping actuators at a time relative to the other pairs to produce movements in either direction along the leading edge 22 of the blade 20. To this end, the plurality of clamping actuators 106a, 106b, 106c is configured to produce a steady crawling-like movement along the blade 20 as the maintenance device 40 is positioned for conducting repair and maintenance actions. It will be understood that other embodiments of the movement drive 100 may include more than three pairs of clamping actuators without departing from the scope of the invention. This design of the movement drive 100 allows for both movement of the maintenance device 40 and rigid engagement in position during repair method steps in order to make repair actions more precise and accurate (e.g., without generating unnecessary additional vibrations), thus helping minimize operational downtime for the repair.

Now turning with reference to FIGS. 4 and 5, the various positioning of the coating applicator tool head 80 according to this embodiment is shown. In FIG. 4, the tool head 80 is shown in a stowed position on the main body 42 of the robotic maintenance device 40, which is shown in phantom in these views to allow particular focus on the tool head 80. Once the maintenance device 40 has moved into position proximate the damage 26 and has prepared the surface 30 for repair (such as by sanding down and cleaning the surface 30 around the damage 26 as identified above), the articulated arm 48 moves into position to connect its interface element 64 with the interface element 66 on the tool head 80. Although many of the other elements of the coating applicator tool head 80 are not visible in the view of FIG. 4, the interface element 66 is advantageously facing towards a top front of the maintenance device 40 for easy access by the articulated arm 48 and its interface element 64. After the articulated arm 48 engages with the tool head 80, the articulated arm 48 moves the tool head 80 into position over the surface 30 as shown in FIG. 5 to conduct steps of applying coating to repair the damage 26 (e.g., along movement arrows 174, for example). The articulated arm 48 is typically the only element of the maintenance device 40 that is moving during this repair step, as the clamping actuators 106a, 106b, 106c of the movement drive 100 are clamped into engagement to securely retain the maintenance device 40 in position without vibrations or movements that could otherwise adversely affect the operation of the tool head 80.

With the orientation change of the coating applicator tool head 80 in FIG. 5, more elements of this tool head 80 are visible. Reference is also now made to FIG. 6, which shows a detailed side view of the tool head 80 in operation as shown in FIG. 5. The coating applicator tool head 80 of this embodiment includes a tool head body 110 including a frame 112 and the aforementioned interface element 66. The frame 112 provides a structure upon which all of the following elements are supported, in this embodiment. The tool head 80 also includes a supply container 114 mounted on the frame 112, the supply container 114 defining a storage volume for holding a coating to be applied to the surfaced 30 of the wind turbine blade 20. The supply container 114 is operatively engaged with a drive 116 that may be actuated to cause delivery of a flow of the coating from the supply container 114. The tool head 80 also includes a feed tube 118 connected to the supply container 114 for receiving the flow of coating, a nozzle 120 connected to the feed tube 118, and an applicator means 122 positioned to receive the flow of coating from the nozzle 120. In this embodiment, the applicator means 122 is advantageously defined by a roller brush 122, but it will be understood that other embodiments of the tool head 80 may include other types of applicators configured to apply the coating onto the surface 30, including but not limited to contoured spreading tools (such as spatulas, etc.). In still further alternative embodiments, the coating can be applied directly by the nozzle 120 or a similar dispenser onto the surface 30 of the blade 20. The coating applicator tool head 80 is thus actuated to generate a flow of coating and apply that flow of coating by rolling same on the surface 30 to fill in the damage 26 and thereby repair the blade 20. As the articulated arm 48 moves the tool head 80 back and forth along the surface 30 as indicated by arrows 124 in FIG. 6, the coating is applied by the roller brush 122 in a similar manner as painting. It will be understood that in other embodiments, the supply container 114 and its drive 116 may alternatively be mounted in a stationary manner on the main body 42 of the maintenance device 40, with appropriate tubing or conduits supplying the dispensed coating to the remainder of the coating applicator tool head 80.

The internal layout and construction of these and other elements of the coating applicator tool head 80 can be seen in further detail from FIGS. 6 and 7. As can be readily appreciated from the cross-section in FIG. 7, the supply container 114 of the tool head 80 includes a first chamber 130 and a second chamber 132 separated from one another by an internal dividing wall 134. The first and second chambers 130, 132 are configured to retain different components that can be mixed together to form the coating to be applied to the wind turbine blade 20. To this end, as the drive 116 is actuated to force flow of the different components from the first and second chambers 130, 132, these different components are joined with one another at a shared outlet 136 communicating with each of the first and second chambers 130, 132. The different components can then be thoroughly mixed together using a mixing element 138 as described in further detail below. Though two chambers 130, 132 are shown in the supply container 114 of these Figures, it will be appreciated that other embodiments of the tool head 80 may use more than two chambers to combine even more components to make the coating in other embodiments consistent with the scope of this invention, e.g., the supply container 114 includes at least two chambers.

Further elements of the drive 116 are also revealed by the cross-section in FIG. 7. In this regard, the drive 116 includes independent actuators associated with each of the first and second chambers 130, 132. One of these independent actuators is defined by a first piston 140 located in an interior of the first chamber 130 and a first motor 142 (shown schematically) engaged with the first piston 140. The first piston 140 may include a face element 144 that moves within the first chamber 130 to force flow of one of the different components into the outlet 136 and a drive stem 146 extending rearwardly from the face element 144 to directly engage with the first motor 142. The drive stem 146 also typically extends outside the housing defined by the frame 112 such that this portion of the first piston 140 can be seen from outside the tool head 80. In a similar fashion, another of the independent actuators is defined by a second piston 150 located in an interior of the second chamber 132 and a second motor 152 engaged with the second piston 150. The second piston 150 also includes a face element 154 that moves within the second chamber 132 and a drive stem 156 extending rearwardly from the face element 154 and directly engaged with the second motor 152. The first and second motors 142, 152 are independently actuated by the control system 90 to advance the first and second pistons 140, 150 as shown by arrows 160 into the first and second chambers 130, 132 to force flow of the different components into the outlet 136 and the downstream mixing element 138.

More particularly, the control system 90 is operatively connected to the first and second motors 142, 152 of the drive 116 (shown schematically in FIG. 7) to thereby define a control/control system for the coating applicator tool head 80. The control system 90 may communicate with the first and second motors 142, 152 via the interface elements 64, 66 described above. The control system 90 operates the first and second motors 142, 152 at independently adjustable speeds, e.g., the first motor 142 is controlled and operated to move the first piston 140 at a speed that is adjustable and may be different from the speed at which the second motor 152 is controlled and operated to move the second piston 150. This arrangement provides the technical benefit of allowing for varying or adjustable mix ratios of the different components to be delivered into the mixing element 138 to form the coating. Different coatings may require different mix ratios of components, so by providing the drive 116 in the manner shown in these Figures, the tool head 80 is configured to handle many different types of coatings that may need to be applied to different wind turbine blade designs. Furthermore, the relative speed of dispensing a flow of the different components and the resultant coating can be adjusted by the first and second motors 142, 152 to correspond with a movement speed of the roller brush 122 and thereby assure a continuous application of the coating onto the surface 30.

While the independent actuators of the drive 116 are shown as first and second independent pistons 140, 150 in this embodiment, it will be understood that alternative types of actuators for forcing flow out of the chambers 130, 132 of the supply container 114 may be used in other embodiments without departing from the scope of the invention. Similarly, it will be understood that the electric or mechanical motors 142, 152 from this embodiment may be replaced by pneumatic and/or hydraulic actuators for advancing the corresponding pistons 140, 150 in further embodiments (such embodiments would typically include hydraulic or pneumatic supply lines running from the maintenance device 40 to the tool head 80, such elements not shown in the illustrated embodiments for simplicity). Regardless of the particular structural arrangement used, the drive 116 advantageously enables independent and adjustable supply of different components in the supply container 114 to make the coating.

The mixing element 138 is schematically shown in further detail in FIGS. 6 and 7. The mixing element 138 of this embodiment is a static mixer 138 including a mixer inlet 162, an elongate mixer body 164 defining a conduit with a series of mixing baffles 166 (or similar elements) located within the conduit, and a mixer outlet 168. The mixer inlet 162 is directly coupled to the shared outlet 136 in the supply container 114. As the different components from the supply container 114 flow through the static mixer 138, the mixing baffles 166 divide and recombine flow in such a manner that the different components are thoroughly mixed with one another to make the coating. The mixer outlet 168 is directly coupled to one end of the feed tube 118 and thus delivers the flow of the now-mixed coating into the feed tube 118. It will be understood that other types of known mixing elements and other types of mixing baffles may be used in other embodiments.

The feed tube 118 of this embodiment is an elongate flexible tube that extends from one end connected to the mixer outlet 168 to another end connected to the nozzle 120. As the nozzle 120 and roller brush 122 are connected to support arms 170 of the frame 112 extending downwardly from around a longitudinal center point of the supply container 114, the feed tube 118 in this embodiment bends rearwardly to deliver the flow of coating from the mixing element 138 to the nozzle 120. A support bracket 172 may be coupled to a front end of the frame 112 to help guide the feed tube 118 and maintain it in position relative to the remainder of the tool head 80. The support bracket 172 is typically defined by a simple elongated L-shaped or Z-shaped bracket as shown in FIG. 7. In alternative embodiments of the tool head 80 in which the nozzle 120 and roller brush 122 are repositioned, the feed tube 118 may be modified from the design shown or omitted altogether, so long as the nozzle 120 continues to receive the flow of coating from the supply container 114 and mixing element 138.

Further elements that may be optionally included in some embodiments of the coating applicator tool head 80 are shown schematically in FIG. 6. To this end, the tool head 80 further includes a drain container 202 connected to the mixing element 138 by a valve 200. The valve 200 is a selector valve such as a three-way valve for controlling flow of coating from the mixing element 138 to either the drain container 202 or the feed tube 118. In this regard, the control system 90 typically operates the valve 200 to initially direct the coating to flow into the drain container 202 until a mixing rate of the different components has reached a desired threshold (e.g., this threshold may be related to the desired mix ratio of the different components to form the coating as needed in this particular maintenance/repair operation). The control system 90 then switches the valve 200 to direct the coating to flow to the nozzle 120 and roller brush 122, which in this embodiment is via the feed tube 118. The valve 200 and drain container 202 allow for the initial dispensing of different components to be discarded to the drain container 202 until the mixing element 138 is properly generating the desired coating, at which point dispensing onto the roller brush 122 or another similar applicator tool can start.

Now with reference to FIGS. 7 and 8, the nozzle 120 and roller brush 122 are shown in further detail. The nozzle 120 of this embodiment includes a nozzle body 176 extending transversely between opposing ends 178a, 178b connected to the two support arms 170 that project downwardly from opposite lateral sides of the frame 112. As most clearly illustrated in FIG. 7, the nozzle body 176 is in the form of a hollow tube-like or cylindrical element that defines a flow path between a nozzle inlet 180 located at a central portion 182 of the nozzle body 176 disposed generally midway between the opposing ends 178a, 178b and a nozzle outlet 184. The nozzle inlet 180 and nozzle outlet 184 are defined by radial openings through the nozzle body 176 in this embodiment, and the nozzle inlet 180 is typically a round aperture shaped to receive flow from the similarly-shaped feed tube 118, while the nozzle outlet 184 is defined by an elongate slot extending transversely along a majority of the width of the nozzle 120 between the opposing ends 178a, 178b thereof. The nozzle inlet 180 is separated from the nozzle outlet 184 along an outer periphery of the nozzle body 176 by some amount, shown in this embodiment to be about 90 degrees apart along the circumference of the outer periphery of the nozzle body 176. It will be understood that the particular positioning of these components of the nozzle 120 may be reconfigured in other embodiments.

As the coating flows into the nozzle 120 via the nozzle inlet 180, the pressure in the flow from the feed tube 118 will force the flow to expand through the hollow tube-like nozzle body 176 to spread out along a width of the nozzle 120. Therefore, the incoming flow of coating at the central portion 182 expands to become an outgoing flow of coating at the nozzle outlet 184 across most of the width of the nozzle 120 as well as the width of the roller brush 122 located adjacent the nozzle 120. To this end, the nozzle outlet 184 is directed towards the roller brush 122 and is positioned adjacent the roller brush 122 such that the flow of coating is applied directly from the nozzle 120 onto the roller brush 122. This arrangement advantageously assures the reliable delivery of all the coating flow onto the roller brush 122 for immediate application then to the surface 30 of the wind turbine blade 20. The nozzle 120 and its elements may be adjusted in other embodiments of the tool head 80 (e.g., such as by providing a different style of outlet(s)).

As also visible from FIG. 8, the nozzle body 176 of this embodiment is defined by an at least partially flexible material. It will be understood that the pressure in the flow of coating, which is generally constant within the nozzle 120, will have a greater effect on the partially flexible material at the central portion 182 that is farther from the support provided by the support arms 170 as compared to the opposing ends 178*a*, 178*b*. Consequently, the elongate slot defining the nozzle outlet 184 may expand to be thicker in open area along the central portion 182 as compared to portions of the nozzle outlet 184 adjacent the opposing ends 178*a*, 178*b* when under the pressure of the flow of coating through the nozzle 120. This arrangement, which is visible in FIG. 8, allows the nozzle 120 to dispense more of the coating along a center of the roller brush 122 as compared to the opposing ends thereof. Typically when repairing damage 26 on a wind turbine blade 20, the deepest portion of the damage 26 will be centrally located as the roller brush 122 moves over the surface 30 to apply the coating, and by having more coating applied to a center of the roller brush 122, the application of coating more readily fills in the damage 26 to make the repairs in an efficient number of passes of the roller brush 122 over the surface 30.

FIGS. 7 and 8 also show further details of the roller brush 122 used with this embodiment of the coating applicator tool head 80. The roller brush 122 is a cylindrical brush rotatably mounted on a support axle 188 that extends between connections to the support arms 170 at the bottom end of those support arms 170. The roller brush 122 is freely rotatable relative to the support axle 188 and the remainder of the tool head 80. As a result, when the articulated arm 48 moves the tool head 80 over the surface 30 of the blade 20 with the roller brush 122 in contact with the surface 30 (as shown by arrows 124 in FIGS. 6 and 7), the roller brush 122 is actuated to rotate by these movements. Accordingly, there is no need for a drive or motor for separately moving the roller brush 122 in this embodiment, thereby simplifying the construction and assembly of the tool head 80.

Therefore, as shown in FIGS. 6 through 9, a repair may be conducted using the robotic maintenance device 40 and the coating applicator tool head 80. To this end, after the articulated arm 48 couples to the tool head 80 and moves the tool head 80 into position over the damage 26 on the wind turbine blade 20, with the roller brush 122 in contact with the surface 30 containing damage 26, the articulated arm 48 is controlled to move the tool head 80 back and forth longitudinally over the surface 30. The maintenance device 40 is stationary during these movements as a result of the clamping actuators 106*a*, 106*b*, 106*c*. Such back and forth movements cause rotation of the roller brush 122 along the surface 30 as shown in FIGS. 6 and 8, and the drive 116 is actuated simultaneously with the movement to cause a flow of coating to be dispensed at the nozzle 120 directly onto the roller brush 122. In this regard, the coating is applied to the roller brush 122 continuously as the roller brush 122 is moved along the surface 30 to thereby apply the coating over the damage 26. Multiple longitudinal passes of the roller brush 122 may be made at differing angles around the leading edge 22 as shown by the multiple positions and the movement arrows 192 in FIG. 9, to apply the coating all over the damage 26 and fill it in to cover and repair same. The specific number of passes and various angles taken by the tool head 80 may be set based on previous repair experience saved in the control system 90 and/or based on the scans made of the damaged area with the vision system 56 at the beginning of the repair process. Where multiple different components are mixed to form the coating at the tool head

80, the drive 116 also independently controls the speed of the actuators to provide a desired mix ratio as the different components flow through the mixing element 138 to produce the coating. This method reliably produces high-quality and precise repairs of so-called category 1 and category 2 damages on a wind turbine blade 20 as a result of continuously directly dispensing the coating from the nozzle 120 onto the roller brush 122 and allowing for varying mix ratios to be set depending on which coating is being applied by the tool head 80. It will be appreciated that if different colors or types of coating are to be applied to the blade 20, additional tool heads would be provided for each different type of coating according to this embodiment of the invention, and the articulated arm 48 would engage with whichever tool head contained the coating needed for the current part of the repairs.

By operating the method described above, routine maintenance can be achieved to remove erosion damage 26 on a blade 20 while the blade 20 remains attached to the wind turbine 10. Furthermore, human intervention such as by rope access technicians is not required, as the maintenance device 40 and tool head 80 are fully autonomous. Thus, the tool head 80 and its associated method of repair for the blade 20 improves the field of maintenance for wind turbine blades 20 and thus may help minimize operational downtime by assuring necessary maintenance and repairs are conducted at regular intervals in a precise and accurate automated manner.

In some embodiments, an additional element may be included on the coating applicator tool head 80 as shown in FIG. 6. This additional element is a curing means 190, which is mounted on the frame 112 at a position spaced apart from the roller brush 122. The curing means 190 is shown schematically in this set of Figures. The curing means 190 is operated by the control system 90 to apply heat energy or the like towards the coating after it has been applied on the surface 30 by the roller brush 122. For example, the curing means 190 may be a heater configured to generate and radiate infrared heat energy or a light source configured to use ultraviolet light to cure the coating. The IR heat energy or UV light helps cure and solidify the repaired area covered by the coating. It will be understood that the particular mounting position and equipment used for the curing means 190 may be modified according to any known design. In embodiments containing the curing means 190, the method of repair includes using the articulated arm 48 to move the infrared curing means 190 over the same surface that the roller brush 122 applied coating upon after application of the coating. Further embodiments may include additional steps such as using the vision system 56 to confirm accuracy and sufficiency of the repair performed by applying the coating after operation of the coating applicator tool head 80.

The coating applicator tool head 80 according to the embodiments of this invention help the robotic maintenance device 40 conduct periodic repairs of damage 26 such as erosion damage on wind turbine blades 20, typically located along and around the leading edge 22 thereof. The tool head 80 is configured to combine and mix different components into a coating using independently variable mix ratios, thereby making the tool head 80 able to dispense many different types of coatings that may be used to build and/or repair wind turbine blades 20. The tool head 80 therefore helps the maintenance device 40 be useable for most, if not all, wind turbine operators. Moreover, the continuous and direct dispensing of the coating from the nozzle 120 onto the roller brush 122 assures thorough and even coverage as the roller brush 122 is moved over the surface 30 by the tool head 80 and the articulated arm 48. The coating applicator tool head 80 thus improves the field of automated repair and maintenance for wind turbine blades 20, which should help improve compliance with routine maintenance schedules and increase operational uptime for wind turbine operators.

FIG. 10 illustrates a repaired section of a wind turbine blade 20 having damage 26 on the leading edge 22 of the blade 20. The repaired section includes a coating 30 of material over the damage 26 on the leading edge 22 of the blade 20. The coating 30 is configured to define a new outer surface 232 that interacts with the air flowing over the blade 20. As such, the coating 30 protects the damage 26 on the wind turbine blade 20 and prevents or reduces the likelihood of the damage 26 further advancing, such as to a higher category of damage. In addition, the coating 30 is preferably shaped so as to minimize any negative impacts of the repair on the aerodynamic performance on the wind turbine blade 20 during use. Thus, the new outer surface 232 is configured to minimize disruptions of the air flow over the blade 20. In this regard and as illustrated in FIG. 10, the coating 30 is configured to be at a maximum thickness at or about the leading edge 22 of the blade 20 and then decrease in thickness in a direction away from the leading edge 22 and toward the trailing edge (not shown) of the blade 20 along both of the outer surfaces 234 (i.e., leeward and windward sides) of the blade 20. Ideally, the thickness of the coating 30 should decay to substantially zero at the outer edges 236 of the coating 30. This allows the coating 30 to merge into the existing surfaces 234 of the blade 20 in a smooth manner, thereby minimizing the disruption of the air flow in the transition from the outer surface 232 of the coating 230 to the original outer surfaces 234 of the blade 20. In an example, the coating 230 may be formed from an epoxy or a polyurethane, but other materials may also be possible. The applicator tool aids in providing a precise and high-quality coating 230 on the leading edge 22 of the wind turbine blade 20 having the shape and features as described above.

FIGS. 11-16 illustrate an applicator tool 240 in accordance with one example. In accordance with this example, the applicator tool 240 includes a spatula 242 for shaping the coating 230 applied to the leading edge 22 of the wind turbine blade 20. Details of the spatula 242 are illustrated in FIGS. 11 and 12. In an example, the spatula 242 may include a generally flexible or bendable extrusion plate 244 made from, for example, rubber or other generally flexible engineering plastics. The extrusion plate 244 may be generally rectangular in shape and include a front edge 246, a rear edge 248, and opposed side edges 250, 252 that extend between the front and rear edges 246, 248. The extrusion plate 244 may further include an outer surface 256 and an inner surface 258 of the spatula 242. The outer surface 256 is configured to face away from the leading edge 22 of the wind turbine blade 20 during use and the inner surface 258 is configured to face toward the leading edge 22 of the blade 20 during use (see FIGS. 14 and 16). In an example, the extrusion plate 244 may be about 1 millimetre (mm) to about 2 mm in thickness between the outer and inner surfaces 256, 258. More preferably, the extrusion plate 244 may be about 1.5 mm in thickness. Other thickness values, however, may be possible depending on the particular application. The extrusion plate 244 may be formed from a low-friction material or include a coating, such as a polytetrafluoroethylene coating, that provides at least the inner surface 258 with low-friction characteristics.

In an example, the spatula 242 may include a spacer to provide a gap between the outer surface 234 of the blade 20 and the inner surface 258 of the extrusion plate 244. In this example, the spacer may include a plurality of ribs 260 disposed beneath the inner surface 258 of the extrusion plate 244. In one example, the plurality of ribs 260 may extend from the inner surface 258 of the extrusion plate 244 of the spatula 242 in a spaced-apart manner. The ribs 260 may be generally parallel to each other and extend from the front edge 246 and toward the rear edge 248 of the extrusion plate 244. In one example, the plurality of ribs 260 extends all the way to the rear edge 248 of the extrusion plate 244 (FIG. 11). In an alternative example, however, the plurality of ribs 260 stops short of the rear edge 248 of the extrusion plate 244 (not shown). The plurality of ribs 260 may extend away from the front edge 246 and along the inner surface 258 substantially perpendicular to the front edge 246 of the extrusion plate 244. The substantially right angle between the front edge 246 and the plurality of ribs 260 is merely exemplary and other angles may be possible in alternative examples.

The plurality of ribs 260 are spaced apart from each other to define grooves 262 between adjacent ribs 260. The grooves 262 are formed by side surfaces of adjacent ribs 260 and a section of the inner surface 258 of the extrusion plate 244 between the adjacent ribs 260. In an example, the plurality of ribs 260 are uniformly spaced apart from each other by a fixed distance. By way of example and without limitation, the ribs 260 may be spaced from each other between about 3 mm and about 8 mm. More preferably, the ribs 260 may be spaced from each other about 5 mm. Other values, however, remain possible and remain within the scope of the present invention. In an alternative example, the spacing between the ribs 260 may be non-uniform across the width of the spatula 242 (not shown). For example, the spacing between adjacent ribs 260 may be at a minimum adjacent a central region 264 of the spatula 242, as generally defined by an area about a central axis 266, and increase in a direction toward the side edges 250, 252 of the extrusion plate 244. In an example, the plurality of ribs 260 may be integrally formed with the extrusion plate 244 such that, for example, the spatula 242 may be formed by a monolithic body. In an alternative example, however, the plurality of ribs 260 may be separately formed and fixedly coupled to the inner surface 258 of the extrusion plate 244 of the spatula 242. The plurality of ribs 260 may also be made from a low-friction material or be coated with a low-friction material.

As will be explained in detail below, the applicator tool 240 may be moved along the leading edge 22 of the wind turbine blade 20 to apply the coating 230 to the blade 20. In this regard, the spatula 242 is configured to engage with the wind turbine blade 20 and extrude coating material applied to the blade 20 immediately behind of the spatula 242 such that after the spatula 242 passes over the deposited coating material, the coating 230 has the desired smoothness and shape, such as that described above. As noted above, the plurality of ribs 260 are configured to operate as spacers so that a gap 268 is provided between the outer surfaces 234 of the wind turbine blade 20 and the inner surface 258 of the extrusion plate 244. The gap 268 generally corresponds to the desired shape of the coating 230, and as the applicator tool 240 is moved along the leading edge 22 of the blade 20, the coating material is essentially extruded from the gap 268 to define the coating 230, as will be explained in more detail below. Thus, it is the plurality of ribs 260 in combination with the extrusion plate 244 that define the shape of the coating 230 on the blade 20. More particularly, it is a height profile 270 (FIG. 12) of the plurality of ribs 260 that generally defines the shape of the coating 230 applied to the leading edge 22 of the blade 20.

In an example, the height profile 2270 defined by the plurality of ribs 260 may be configured to have a maximum height in the central region 264 of the extrusion plate 244 and decreases in height away from the central region 264 and towards the side edges 250, 252 of the extrusion plate 244. In a preferred example, the height of the ribs 260 decay to substantially zero in a direction away from the central region 264 and toward the side edges 250, 252 of the extrusion plate 244. The height profile 2270 may have a wide range of configurations such that the height is a maximum near the central region 264 and then decays to substantially zero near the side edges 250, 252. For example, the region of maximum height in the height profile 2270 may extend over several of the ribs 260 (e.g., 3, 5, or 7 ribs) in the central region 264, and then start decreasing in height outside of this region. Moreover, the decrease in the rib height may have different configurations. For example, the rib height may decrease from the maximum height in the central region 264 to substantially zero in a linear, parabolic, or exponential fashion. Other decaying configurations may also be possible. In any event, the height profile 2270 of the plurality of ribs 260 operates to define generally the cross-sectional shape of the coating 230 applied to the wind turbine blade 20. In one example, a plurality of spatulas 242 may be provided wherein each spatula 242 will have a different height profile 2270. Thus, the particular height profile 2270 may be selected based on the needs or desires of the coating 230 for a particular application. In an example, the height profile 2270 of the plurality of ribs 260 is preferably substantially symmetric about the central axis 266 of the extrusion plate 244 such that the resulting coating 230 is substantially symmetric about the leading edge 22 of the blade 20.

FIGS. 13-16 illustrate the use of the applicator tool 240 for making a repair to the leading edge 22 of the wind turbine blade 20 in greater detail. The applicator tool 240 generally includes a frame 274 having a front support 276 and a rear support 278. The front support 276 includes a pair of arms 280 that terminate in respective compression pads 282. One or more springs 284 or other biasing mechanisms may be coupled to the arms 280 and/or pads 282 for pressing the spatula 242 against the outer surface 234 of the wind turbine blade 20 as indicated by arrows F. The rear support 278 may include a feed tube 118 that is operatively coupled (e.g., such as by a pump or the like) to a source of coating material (not shown) and is configured to supply the coating material onto the outer surface 234 of the wind turbine blade 20. The spatula 242 may be positioned on the frame 274 so as to be supported by the front and rear supports 276, 278. For example, the compression pads 282 may be adhered or otherwise selectively and removably coupled to the outer surface 256 of the extrusion plate 244 adjacent the front edge 246 and side edges 250, 252 of the spatula 242. Moreover, the central region 264 of the spatula 242 adjacent the rear edge 248 may be supported by rear support 278 such as with a tab, hook or possibly by the feed tube 118. The feed tube 118 is generally positioned beneath the spatula 242. As illustrated in FIGS. 13 and 15, the frame 274 or the spatula 242 may be angled relative to the leading edge 22 of the blade 20 such that the rear edge 248 of the spatula 242 is above the blade 20 a greater distance than the front edge 246 of the spatula 242. This defines a funnel-shaped space 288 between the blade 20 and the spatula 242 wherein the area between the blade 20 and the spatula 242 decreases in a direction toward the front edge 246 of the spatula 242. The feed tube 118 is configured to extend into the funnel-shaped space 288 and deliver the coating material within this space to form the coating 230.

As illustrated in FIGS. 13-16, to effectuate maintenance and repair of damage 26 on the leading edge 22 of the wind turbine blade 20, the applicator tool 240 may be positioned on the blade 20 such that the plurality of ribs 260 confront the surface 234 of the blade 20 and the ends of the ribs 260 engage the outer surface 234 of the blade 20. The compression pads 282 may press the spatula 242 against the outer surfaces 234 of the blade 20 at some distance from the leading edge 22. Moreover, the central axis 266 of the extrusion plate 244 may be configured to be aligned with the leading edge 22 of the blade 20. This arrangement is shown, for example, in FIGS. 14 and 16. The coating material may then be directed to the feed tube 118 for deposit in the funnel-shaped space 288 between the surface 234 of the blade 20 and the spatula 242. This is illustrated, for example, in FIG. 15.

As the coating material fills the funnel-shaped space 288, the applicator tool 240 may be moved along the leading edge 22 of the blade 20 as demonstrated by arrow A in FIGS. 13 and 15. As the applicator tool 240 moves, the coating material is forced into the funnel toward the front edge 246 of the spatula 242 and is essentially extruded from the grooves 262 at the front edge 246 of the extrusion plate 244. In this example, the coating material is applied to the outer surface 234 of the blade 20 in strips 290 separated from each other due to the presence of the ribs 260 at the front edge 246 of the extrusion plate 244. The height of the strips 290 is dictated by the height profile 270 of the spatula 242. After the coating material is applied to the outer surface 234 of the wind turbine blade 20 in strips 290, the coating material flows under the influence of gravity, surface tension, or other effects to form a smooth and continuous coating 230 having a profile dictated by the height profile 270 of the spatula 242 (e.g., see FIG. 10). In this example, the coating material must be generally flowable (i.e., having a suitable viscosity) that allows the coating material to merge together to form the continuous coating 230 but without having the material simply flow uncontrollably over the outer surface 234 of the blade 20, as might happen with a coating material with a too low of a viscosity. It should be understood that after the coating 230 has dried or cured, the applicator tool 240 may be used to make additional passes over the damage 26 on the leading edge 22 of the blade 20. In this way, the final coating 230 may be comprised of a plurality of layers, with each layer applied using the applicator tool 240 as described above.

FIGS. 17-21 illustrate an applicator tool in accordance with another example. The applicator tool is similar to that described above in that the tool is configured to apply a coating to damage on the leading edge of the wind turbine blade in an improved manner. However, there are a number of distinctions between the applicator tool of this example and that described above that will be highlighted by the following description. By way of example, one difference is the manner in which the coating is applied to the wind turbine blade. More particularly, the applicator tool described above applies strips of the coating material onto the surface of the wind turbine blade as a result of the rib/groove configuration of the spatula. The rib/groove configuration of the spatula is, in turn, a consequence of defining the height profile of the spatula, which ultimately defines the shape of the coating on the blade. In any event, after the strips are applied to the blade, the coating material has to possess a suitable viscosity that allows the material to flow under the influence of gravity and surface tension effects to form a smooth and continuous coating.

The applicator tool in an alternative example described below, however, is configured to operate in a different way. As described in more detail below, the applicator tool is configured to shape the coating material being extruded from the applicator tool more directly. In other words, the coating material extruded from the applicator tool is in a shape that substantially and more directly corresponds to the final shape of the coating on the leading edge of the wind turbine blade. Thus, the application of the coating material in strips and merging of the strips to form the final coating is avoided with this alternative applicator tool. This distinction may have particular relevance when working with coating materials with a high viscosity, such that the strips of the coating material using the applicator tool described above would not flow together under gravity and other effects to form a smooth and continuous coating on the blade. Thus, the alternative applicator tool described below may be ideally suited for high viscosity coating materials.

Another distinction between the applicator tool described above and the alternative applicator tool below is the ability to more dynamically change the profile of the coating applied to the blade. As discussed above, the profile of the coating is dictated primarily by the height profile of the plurality of ribs on the extrusion plate. Recall that if a different profile is desired, then a different spatula is generally required to provide that new profile. The applicator tool in the alternative example is configured to have some ability to selectively adjust the profile of the coating provided by a pass of the applicator tool along the blade. This adjustable feature as well as other features of the alternative applicator tool will now be described in detail.

The applicator tool 240 includes a spatula 242 for shaping the coating 230 applied to the leading edge 22 of the wind turbine blade 20. In an example, the spatula 242 may include a generally flexible or bendable extrusion plate 244 made from, for example, rubber or other generally flexible engineering plastics. The extrusion plate 244 may be generally rectangular in shape and include a front edge 246, a rear edge 248, and opposed side edges 250, 252 that extend between the front and rear edges 246, 248. The extrusion plate 244 may further include an outer surface 256 and an inner surface 258 of the spatula 242. The outer surface 256 is configured to face away from the leading edge 22 of the wind turbine blade 20 during use and the inner surface 258 is configured to face toward the leading edge 22 of the blade 20 during use (see FIGS. 19 and 21). In an example, the extrusion plate 244 may be about 1 mm to about 2 mm in thickness between the outer and inner surfaces 256, 258. More preferably, the extrusion plate 244 may be about 1.5 mm in thickness. Other thickness values, however, may be possible depending on the particular application.

Similar to the above, the spatula 242 may include one or more spacers to provide a gap between the surface 234 of the blade 20 and the inner surface 258 of the extrusion plate 244. In this example, the one or more spacers may include a rigid blade or spine 306 disposed beneath the inner surface 258 of the extrusion plate 244. Unlike the applicator tool described above, the spine 306 is not integrally formed with the extrusion plate 244 but is a separate element that works in conjunction with the extrusion plate 244 in operation of the applicator tool 240. The spine 306 includes a front edge 308, rear edge 310, upper edge 312 and lower edge 314. In an example, the front edge 308 forms a substantially right angle relative to the upper edge 312 and the lower edge 314 forms an acute angle relative to the upper edge 312 (see FIGS. 18 and 21). For example, the lower edge 314 may be angled between about 15 degrees and about 45 degrees relative to the upper edge 312. As explained in more detail below, the lower edge 314 is configured to engage with the leading edge 22 of the wind turbine blade 20 during use and the configuration of the spine 306 provides a gap between the outer surface 234 of the blade 20 and the inner surface 258 of the extrusion plate 244. The spatula 242 further includes a feed tube 118 that is coupled to the rear edge 310 of the spine 306 at one end thereof and is operatively coupled (such as by a pump or the like) to a source of coating material (not shown) at another end thereof for supplying the coating material onto the outer surface 234 of the wind turbine blade 20. In one example, the spine 306 may be integrally formed with the end of the feed tube 118. In an alternative example, these elements may be separate and subsequently coupled together.

The extrusion plate 244 is carried by a rigid support 320 having a tubular portion 320 and a finger 322 coupled to and extending forward of the tubular portion 320. For example, the rigid support 320 may include a tab that is received in a hole in the extrusion plate 244. Other attachment means, however, may be possible. The tubular portion 320 is generally disposed about an end of the feed tube 118 in, for example, a coaxial and telescoping manner. The finger 322 extends from an upper region of the tubular portion 320 and includes a generally arcuate central portion 324 and a pair of wings 326 extending on both sides of the central portion 322. The extrusion plate 244 is coupled to the rigid support 320 and generally disposed between the finger 322 of the support 320 and the spine 306. In an example, the extrusion plate 244 may be movable relative to the spine 306. More particularly, the rigid support 320 is slidable over the feed tube 118, which in turn moves the extrusion plate 244 relative to the spine 306 generally along a direction illustrated by arrows B (FIG. 17). The relative movement between the extrusion plate 244 and the spine 306 (which may be permitted for only a limited distance) allows the height profile of the coating material extruded from the applicator tool 240 to be varied. For example, in a forward position of the extrusion plate 244 relative to the spine 306, the height of the coating material (e.g., at the central axis 266 of the extrusion plate 244) may be at a minimum, and in a rearward position of the extrusion plate 244 relative to the spine 306, the height of the coating material at the central axis of the extrusion plate 244 may be at a maximum. In other words, while the applicator tool 240 is configured to provide a coating 230 similar to that shown in FIG. 10, for example, the thickness of the coating (such as at the leading edge 22 of the blade 20) may be varied depending on the position of the extrusion plate 244 relative to the spine 306. In any event, when the desired thickness of the coating 230 is determined, a set screw may be used to fix the relative positions of the extrusion plate 244 and the spine 306 to thereby fix the thickness of the coating 230 at the leading edge 22, for example. Additionally, the feed tube 118 and the rigid support 320 may have a keying feature 328 (e.g., key and corresponding keyway) to prevent relative rotations between the feed tube 118 and the rigid support 320.

As will be explained in detail below, the applicator tool 240 may be moved along the leading edge 22 of the wind turbine blade 20 to apply the coating 230 to the blade 20. In this regard, the spatula 242 is configured to engage with the wind turbine blade 20 and extrude coating material applied to the blade 20 immediately behind the extrusion plate 244 of the spatula 242 such that after the spatula 242 passes over the deposited coating material, the coating 230 has the desired smoothness and shape. As noted above, the spine 306 is configured to operate as a spacer so that a gap 268 is provided between the outer surfaces 234 of the wind turbine blade 20 and the inner surface 258 of the extrusion plate 244. The gap 268 in this example more directly corresponds to the desired shape of the coating 230, and as the applicator tool 240 is moved along the leading edge 22 of the blade 20, the coating material is essentially extruded from the gap 268 to ultimately define the coating 230, as will be explained in more detail below. Thus, it is the spine 306 in combination with the extrusion plate 244 that defines the shape of the coating 230 on the blade 20. More particularly, it is the position of the extrusion plate 244 relative to the spine 306 that defines a height profile which generally defines the shape of the coating 230 applied to the leading edge 22 of the blade 20.

In an example, the height profile 270 defined by the spine 306 may be configured to have a maximum height in the central region 264 of the extrusion plate 244 and decrease in height away from the central region 264 and towards the side edges 250, 252 of the extrusion plate 244. In a preferred example, there is but a single spine 306 in the central region 264 of the spatula 242. Due to the lack of other spines away from the central region 264, the height profile 270 defined by the spine 306 decays to substantially zero in a direction away from the central region 264 and toward the side edges 250, 252 of the extrusion plate 244. The height profile 270 may have a wide range of configurations such that the height is a maximum near the central region 264 and then decays to substantially zero near the side edges 250, 252. The height profile 270 of provided by the spine 306 operates to define the cross-sectional shape of the coating 230 applied to the wind turbine blade 20. As explained above, the relative position of the extrusion plate 244 and the spine 306 may be adjusted to vary the height profile 270 provided by the spatula 242. The particular height profile 270 may be selected based on the needs or desires of the coating 230 for a particular application. In an example, the height profile 270 provided by the spine 306 is substantially symmetric about the central axis 266 of the extrusion plate 244 such that the resulting coating 230 is substantially symmetric about the leading edge 22 of the blade 20.

As illustrated in FIGS. 19-22, to effectuate maintenance and repair of damage 26 on the leading edge of the wind turbine blade 20, the applicator tool 240 may be positioned on the blade 20 such that the spine 306, and more particularly the lower edge 314 thereof, engages the surface 234 of the blade 20 substantially along the leading edge 22. The applicator tool 240 may further include compression pads 282 or other biasing mechanisms that press the extrusion plate 244 against the outer surfaces 234 of the blade 20 at some distance removed from the leading edge 22. Moreover, the central axis 266 of the spatula 242 may be configured to be aligned with the spine 306 (and leading edge 22 of the blade 20). This arrangement is shown, for example, in FIGS. 20 and 22. The coating material may then be directed to the feed tube 118 for deposit in the funnel-shaped space 288 between the outer surfaces 234 of the blade 20 and the inner surface 258 of the extrusion plate 244. This is illustrated, for example, in FIG. 21.

As the coating material fills the funnel-shaped space 288, the applicator tool 240 may be moved along the leading edge 22 of the blade 20 as demonstrated by arrow A in FIGS. 19 and 21. As the applicator tool 240 moves, the coating material is forced into the funnel toward the front edge 246 of the spatula 242 and is essentially extruded from the front edge 246 of the extrusion plate 244. In this example, the coating material is applied to the outer surfaces 234 of the blade 20 as a whole (e.g., instead of in strips) to form a smooth and continuous coating 230 having a profile that corresponds to the height profile 270 of the spatula 242 (e.g., see FIG. 10). It should be understood that after the coating 230 has dried or cured, the applicator tool 240 may be used to make additional passes over the damage 26 on the leading edge 22 of the blade 20. In this way, the final coating 230 may be comprised of a plurality of layers, with each layer applied using the applicator tool 240 as described above.

FIG. 23 illustrates an applicator tool 240 very similar to that described above. The primary difference is that the spatula 242 includes a plurality of spines 306 instead of a single spine, as described above. The additional spines 306 not only help define the height profile 270, but are also configured to provide stability to the applicator tool 240 as the tool is moving along the leading edge 22 of the wind turbine blade 20. For instance, with a single spine 306, the applicator tool 240 may be susceptible to movements (e.g., slips) away from the leading edge 22 of the blade 20. The plurality of spines 306 now engage the surface 234 of the blade 20 in multiple locations about the leading edge 22, and thereby reduces the likelihood of the applicator tool 240 from slipping away from the leading edge 22 as the applicator tool 240 is moved.

The example of the applicator tool 240 described above improve maintenance and repairs for erosion damage at the leading edge of the wind turbine blade. More particularly, the applicator tool 240 provides an apparatus and method for applying a coating over the damage at the leading edge so as to arrest further deterioration of the wind turbine blade. Additionally, the applicator tool 240 provides a coating that has an ideal profile, i.e., having a maximum thickness at the leading edge of the blade and then decaying in thickness to substantially zero thickness away from the leading edge so as to smoothly merge into the outer surfaces of the wind turbine blade. The profile provided by the applicator tool 240 minimizes disruptions of the airflow over the blade and any resulting reduction in aerodynamic performance as a result of those disruptions. The applicator tool 240 is particularly advantageous when repairing wind turbine blades in field conditions when, for example, the blades remain attached to the rotor hub at the top of the tower of the wind turbine. Thus, even in less than ideal field conditions, the applicator tool 240 is able to provide a high quality and precise repair of the damaged area of the wind turbine blade.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A coating applicator tool head configured to be used with a robotic maintenance device for repairing damage around a leading edge of a wind turbine blade, the coating applicator tool head comprising:
   a tool head body including a frame and an interface element configured to mechanically and electrically couple with a corresponding interface provided on an articulated arm of the robotic maintenance device;
   a spreading tool mounted on the frame and configured to be moved along surfaces of the wind turbine blade to spread a coating thereon;

a supply container defining at least two chambers configured to retain different components that can be mixed together to form a coating to be dispensed onto the spreading tool for application to the wind turbine blade;

a drive operatively engaged with the supply container and actuated to deliver a flow of the coating from the supply container;

a mixing element connected to the supply container, the mixing element configured to receive the different components from the at least two chambers and mix them into the coating; and a control system operatively connected to the drive, the control system operating the drive to supply each of the different components at a mix ratio adapted to produce the coating when mixed at the mixing element, wherein the control system varies a speed of the drive to vary a flow rate of coating being dispensed onto the spreading tool, the flow rate being adjusted in accordance with a movement speed of the spreading tool so as to continuously apply the coating onto the spreading tool during operation of the coating applicator tool head.

2. The coating applicator tool head of claim 1, wherein the mixing element is defined by a static mixer configured to mix the different components as the different components flow through an elongate length of the static mixer.

3. The coating applicator tool head of claim 1, further comprising:

a drain container connected to the mixing element; and a valve operatively connected to the mixing element, the drain container, and the spreading tool, the valve controlling flow of the coating exiting the mixing element to be delivered into either the drain container or the spreading tool, characterized in that the valve initially directs the coating to flow into the drain container until a mixing rate of the different components has reached a desired threshold, and then the valve directs the coating to flow into the spreading tool.

4. The coating applicator tool head of claim 1, wherein the spreading tool comprises:

a roller brush rotatably mounted on the frame;

a feed tube configured to receive a flow of a coating from the supply container; and a nozzle located adjacent the roller brush and connected to the feed tube so as to spread the flow of the coating along a width of the roller brush and then apply the coating directly onto the roller brush, such that the coating is then transferred by the roller brush onto the surfaces of the wind turbine blade to apply layers of the coating to cover and repair the damage on the wind turbine blade.

5. The coating applicator tool head of claim 4, wherein the nozzle comprises:

a nozzle body extending transversely along the width of the roller brush between opposing ends supported by the frame of the tool head body;

an inlet located centrally between the opposing ends of the nozzle body; and an outlet defined by an elongate slot cut into the nozzle body to extend between the opposing ends and face towards the roller brush, the elongate slot configured to dispense the coating along the width of the roller brush.

6. The coating applicator tool head of claim 5, wherein the nozzle body is defined by an at least partially flexible material such that pressure in the flow of the coating from the inlet expands the elongate slot at a central portion as compared to portions proximate the opposing ends, thereby causing a higher dispense flow rate of coating onto a center of the roller brush than at opposite ends thereof.

7. The coating applicator tool head of claim 1, wherein the spreading tool is a spatula comprising:

a flexible extrusion plate having a front edge, a rear edge, opposed side edges, an outer surface, and an inner surface, the extrusion plate further having a central region defined by a central axis; and one or more spacers positioned proximate the inner surface of the extrusion plate, wherein the one or more spacers are configured to define a gap between an outer surface of the wind turbine blade and the inner surface of the extrusion plate; and a feed tube for supplying a coating material to the spatula, wherein the spatula is configured to shape the coating material into a coating over a damaged area of the wind turbine blade.

8. The coating applicator tool head according to claim 7, wherein the one or more spacers define a height profile that corresponds to the shape of the coating from the applicator tool.

9. The coating applicator tool head according to claim 8, wherein the height profile has a maximum adjacent the central region of the extrusion plate and decays to substantially zero adjacent the side edges of the extrusion plate.

10. The coating applicator tool head according to claim 7, wherein the extrusion plate is selectively movable relative to the one or more spacers.

11. The coating applicator tool head according to claim 10, wherein relative movement between the extrusion plate and the one or more spacers varies the height profile.

12. The coating applicator tool head according to claim 7, wherein the one or more spacers include a plurality of ribs coupled to the inner surface of the extrusion plate and extending from the front edge toward the rear edge, and wherein the plurality of ribs defines grooves between adjacent ribs.

13. The coating applicator tool head according to claim 12, wherein a height of the plurality of ribs varies, and wherein the height of the plurality of ribs is at a maximum adjacent the central region of the extrusion plate and decreases in height away from the central region and toward the side edges.

14. The coating applicator tool head according to claim 7, wherein the one or more spacers include one or more spines having a front edge, a rear edge, an upper edge, and a lower edge.

15. The coating applicator tool head according to claim 14, wherein the lower edge is angled relative to the upper edge by an acute angle, and wherein the lower edge is configured to engage the outer surface of the wind turbine blade.

16. The coating applicator tool head according to claim 14, wherein the one or more spines is separate from the extrusion plate.

17. The coating applicator tool head according to claim 14, wherein the one or more spines is positioned proximate the inner surface of the extrusion plate about the central region, and wherein the one or more spines extends in a direction generally parallel to the central axis.

18. The coating applicator tool head according to claim 14, wherein the extrusion plate is coupled to a rigid support, wherein the one or more spines is coupled to the feed tube, and wherein the rigid support is slidable relative to the feed tube.

19. The coating applicator tool head of claim 1, wherein the spreading tool is a roller brush rotatably coupled to the frame, the roller brush is mounted on the frame at opposing ends in such a manner to enable free rotation of the roller brush relative to the frame, and rotation of the roller brush is actuated by movement of the coating applicator tool head by the articulated arm back and forth along the surfaces of the wind turbine blade.

20. The coating applicator tool head of any of claim 1, further comprising:

a curing means mounted on the frame at a position spaced apart from the spreading tool, the curing means configured to apply heat energy and/or light towards the coating after application on the surfaces of the wind turbine blade to help cure and solidify a repaired area covered by the coating.

21. The coating applicator tool head of any of claim 1, wherein the drive includes actuators associated with each of the at least two chambers.

22. The coating applicator tool head of claim 21, wherein the actuators of the drive are defined by pistons each configured to move relative to one of the at least two chambers to force flow of an associated component out of the chamber and into the mixing element.

23. The coating applicator tool head of claim 22, wherein the drive includes actuator motors engaged with each of the pistons.

24. The coating applicator tool of claim 21, wherein actuators are independent of one another, and wherein the control system is configured to operate the actuators at independently adjustable speeds.

25. A method for automatically repairing damage around a leading edge of a wind turbine blade connected to a wind turbine, the method comprising:

coupling a coating applicator tool head to an articulated arm of a robotic maintenance device that has been positioned along the leading edge of the wind turbine blade such that the articulated arm can move the coating applicator tool head into position around a location containing damage on the wind turbine blade;

actuating a drive associated with a supply container operatively connected with the coating applicator tool head to move actuators of the drive relative to corresponding chambers of the supply container which contain different components that can be mixed together to form a coating for the wind turbine blade, to thereby deliver a flow of the different components into a mixing element;

mixing with the mixing element the flow of the different components to produce a flow of the coating which is delivered to a spreading tool;

moving the coating applicator tool head with the articulated arm so that the spreading tool moves along surfaces of the wind turbine blade to apply layers of the coating to the surfaces of the wind turbine blade, thereby covering and repairing the damage on the wind turbine blade;

controlling the actuators of the drive to supply the different components at a desired mix ratio adapted to produce the coating when mixed at the mixing element; and varying a speed of the drive to vary a flow rate of coating being dispensed onto the spreading tool, the flow rate being adjusted in accordance with a movement speed of the spreading tool so as to continuously apply the coating onto the spreading tool during operation of the coating applicator tool head.

* * * * *